(12) United States Patent
Warren et al.

(10) Patent No.: US 7,689,504 B2
(45) Date of Patent: Mar. 30, 2010

(54) SYSTEM AND METHOD FOR ESTABLISHING OR MODIFYING AN ACCOUNT WITH USER SELECTABLE TERMS

(75) Inventors: Mary Carter Warren, Baltimore, MD (US); Marc L. Fredman, Chicago, IL (US); Kimberly L. Hoechst, West Chester, PA (US); Douglas A. Filak, Kennett Square, PA (US); James C. Steckart, Evanston, IL (US); George W. Blossom, West Chester, PA (US); Ron E. Jacobs, Wilmington, DE (US); Donna M. Barrett, Wilmington, DE (US); Donald H. Schmitt, Greenville, DE (US); Bradley R. Strock, Landenburg, PA (US); Kathleen H. Witsil, Kennett Square, PA (US); Karen R. Ehemann, Newark, DE (US); Katrina Dowidchuck, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 1702 days.

(21) Appl. No.: 10/284,394

(22) Filed: Oct. 31, 2002

(65) Prior Publication Data

US 2003/0101131 A1    May 29, 2003

Related U.S. Application Data

(60) Provisional application No. 60/330,871, filed on Nov. 1, 2001.

(51) Int. Cl.
*G06Q 40/00* (2006.01)
(52) U.S. Cl. ..................................................... 705/38

(58) Field of Classification Search .................. None
See application file for complete search history.

(56) References Cited

U.S. PATENT DOCUMENTS 3,705,385 A    12/1972  Bats
(Continued)

FOREIGN PATENT DOCUMENTS

CA    2430549    6/2002
(Continued)

OTHER PUBLICATIONS

Berliner, Uri. Innovative Credit-Card Fashions Take Hold. San Diego Union-Tribune. Jun. 13, 1996. p. A1.*

(Continued)

*Primary Examiner*—Jason M Borlinghaus
(74) *Attorney, Agent, or Firm*—Hunton & Williams LLP

(57) ABSTRACT

The present invention relates to methods for allowing an account holder to easily customize the terms of an account such as a loan account, an asset account, a mortgage account, an insurance account, or a brokerage account. Exemplary embodiments of the invention allow the user to specify various preferred terms such as cost (e.g., APR and annual fee), rewards programs, card design, affiliates, credit line, and payment due date, among others. The financial service provider issuing the account, e.g., the issuing bank, may make the various available terms for the account easily accessible to the user, for example through an internet website or an automated phone system, enabling the user to easily specify his or her preferences. The customization methods may be applied to the process of opening a new account or customizing an existing account. The customization methods may dynamically update the available terms as the user begins to select his or her desired terms.

14 Claims, 8 Drawing Sheets

U.S. PATENT DOCUMENTS

| | | |
|---|---|---|
| 3,860,870 A | 1/1975 | Furuya |
| 3,896,266 A | 7/1975 | Waterbury |
| 3,938,091 A | 2/1976 | Liu |
| 4,013,962 A | 3/1977 | Beseke et al. |
| 4,321,672 A | 3/1982 | Thomson |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Roach |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,025,372 A | 6/1991 | Burton et al. |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,212,792 A | 5/1993 | Gerety et al. |
| 5,220,501 A | 6/1993 | Lawlor |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,315,504 A | 5/1994 | Lemble |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,424,938 A | 6/1995 | Wagner |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,466,919 A | 11/1995 | Hovakimian |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,485,370 A | 1/1996 | Naylor |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,437 A | 7/1996 | Kaku |
| 5,544,086 A | 8/1996 | Davis |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,578,808 A | 11/1996 | Taylor |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakely et al. |
| 5,606,496 A | 2/1997 | D'Agostino |
| 5,611,052 A | 3/1997 | Dykstra et al. |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,644,778 A | 7/1997 | Burks et al. |
| 5,649,118 A | 7/1997 | Carlisle et al. |
| 5,652,786 A | 7/1997 | Rogers |
| 5,653,914 A | 8/1997 | Gruener |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,706,452 A | 1/1998 | Ivanov |
| 5,710,886 A | 1/1998 | Christensen et al. |
| 5,710,887 A | 1/1998 | Chelliah |
| 5,710,889 A | 1/1998 | Clark |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,742,775 A | 4/1998 | King |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray et al. |
| 5,761,647 A | 6/1998 | Boushy |
| 5,761,661 A | 6/1998 | Coussens |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schneier et al. |
| 5,774,122 A | 6/1998 | Kojima |
| 5,774,870 A | 6/1998 | Storey |
| 5,778,178 A | 7/1998 | Arunachalam |
| 5,781,909 A | 7/1998 | Logan et al. |
| 5,784,562 A | 7/1998 | Diener |

| | | | | | | |
|---|---|---|---|---|---|---|
| 5,787,403 A | 7/1998 | Randle | | 5,898,780 A | 4/1999 | Liu et al. |
| 5,787,404 A | 7/1998 | Fernandez-Holmann | | 5,899,982 A | 5/1999 | Randle |
| 5,790,650 A | 8/1998 | Dunn | | 5,903,881 A | 5/1999 | Schrader |
| 5,790,785 A | 8/1998 | Klug et al. | | 5,909,486 A | 6/1999 | Walker et al. |
| 5,793,861 A | 8/1998 | Haigh | | 5,910,988 A | 6/1999 | Ballard |
| 5,794,178 A | 8/1998 | Caid et al. | | 5,913,202 A | 6/1999 | Motoyama |
| 5,794,207 A | 8/1998 | Walker et al. | | 5,914,472 A | 6/1999 | Foladare et al. |
| 5,794,221 A | 8/1998 | Egendorf | | 5,915,244 A | 6/1999 | Jack et al. |
| 5,794,259 A | 8/1998 | Kikinis | | 5,918,214 A | 6/1999 | Perkowski |
| 5,796,395 A | 8/1998 | De Hond | | 5,918,217 A | 6/1999 | Maggioncalda |
| 5,797,127 A | 8/1998 | Walker et al. | | 5,918,239 A | 6/1999 | Allen et al. |
| 5,798,508 A | 8/1998 | Walker et al. | | 5,920,847 A | 7/1999 | Kolling et al. |
| 5,802,498 A | 9/1998 | Comesanas | | 5,921,864 A | 7/1999 | Walker et al. |
| 5,802,502 A | 9/1998 | Gell | | 5,923,763 A | 7/1999 | Walker et al. |
| 5,805,719 A | 9/1998 | Pare et al. | | 5,926,796 A | 7/1999 | Walker et al. |
| 5,815,657 A | 9/1998 | Williams et al. | | 5,926,812 A | 7/1999 | Hilsenrath |
| 5,815,665 A | 9/1998 | Teper et al. | | 5,930,217 A | 7/1999 | Kayanuma |
| 5,815,683 A | 9/1998 | Vogler | | 5,930,764 A | 7/1999 | Melchione |
| 5,818,936 A | 10/1998 | Mashayekhi | | 5,933,816 A | 8/1999 | Zeanah |
| 5,819,092 A | 10/1998 | Ferguson | | 5,933,817 A | 8/1999 | Hucal |
| 5,819,285 A | 10/1998 | Damico | | 5,933,823 A | 8/1999 | Cullen |
| 5,825,863 A | 10/1998 | Walker | | 5,933,827 A | 8/1999 | Cole |
| 5,825,870 A | 10/1998 | Miloslavsky | | 5,940,811 A | 8/1999 | Norris |
| 5,826,023 A | 10/1998 | Hall et al. | | 5,940,812 A | 8/1999 | Tengel et al. |
| 5,826,241 A | 10/1998 | Stein | | 5,943,656 A | 8/1999 | Crooks |
| 5,826,245 A | 10/1998 | Sandberg-Diment | | 5,944,824 A | 8/1999 | He |
| 5,826,250 A | 10/1998 | Trefler | | 5,945,653 A | 8/1999 | Walker et al. |
| 5,828,734 A | 10/1998 | Katz | | 5,946,388 A | 8/1999 | Walker et al. |
| 5,828,751 A | 10/1998 | Walker et al. | | 5,947,747 A | 9/1999 | Walker et al. |
| 5,828,812 A | 10/1998 | Khan et al. | | 5,949,044 A | 9/1999 | Walker et al. |
| 5,828,833 A | 10/1998 | Belville et al. | | 5,949,875 A | 9/1999 | Walker et al. |
| 5,832,211 A | 11/1998 | Blakley, III et al. | | 5,950,173 A | 9/1999 | Perkowski |
| 5,832,460 A | 11/1998 | Bednar | | 5,950,174 A | 9/1999 | Brendzel |
| 5,832,476 A | 11/1998 | Tada | | 5,950,206 A | 9/1999 | Krause |
| 5,835,087 A | 11/1998 | Herz | | 5,952,639 A | 9/1999 | Ohki |
| 5,835,580 A | 11/1998 | Fraser | | 5,952,641 A | 9/1999 | Korshun |
| 5,835,603 A | 11/1998 | Coutts | | 5,953,710 A | 9/1999 | Fleming |
| 5,838,906 A | 11/1998 | Doyle | | 5,956,695 A | 9/1999 | Carrithers et al. |
| 5,842,178 A | 11/1998 | Giovannoli | | 5,958,007 A | 9/1999 | Lee et al. |
| 5,842,211 A | 11/1998 | Horadan | | 5,960,411 A | 9/1999 | Hartman et al. |
| 5,844,553 A | 12/1998 | Hao | | 5,961,593 A | 10/1999 | Gabber et al. |
| 5,845,259 A | 12/1998 | West et al. | | 5,963,635 A | 10/1999 | Szlam et al. |
| 5,845,260 A | 12/1998 | Nakano et al. | | 5,963,925 A | 10/1999 | Kolling et al. |
| 5,847,709 A | 12/1998 | Card | | 5,963,952 A | 10/1999 | Smith |
| 5,848,143 A | 12/1998 | Andrews | | 5,963,953 A | 10/1999 | Cram et al. |
| 5,848,190 A | 12/1998 | Kleehammer et al. | | 5,966,695 A | 10/1999 | Melchione et al. |
| 5,848,400 A | 12/1998 | Chang | | 5,966,699 A | 10/1999 | Zandi |
| 5,848,427 A | 12/1998 | Hyodo | | 5,967,896 A | 10/1999 | Jorasch et al. |
| 5,852,812 A | 12/1998 | Reeder | | 5,969,318 A | 10/1999 | Mackenthun |
| 5,857,079 A | 1/1999 | Claus et al. | | 5,970,143 A | 10/1999 | Schneier et al. |
| 5,862,223 A | 1/1999 | Walker | | 5,970,470 A | 10/1999 | Walker et al. |
| 5,862,323 A | 1/1999 | Blakley, III et al. | | 5,970,478 A * | 10/1999 | Walker et al. .................. 705/35 |
| 5,864,830 A | 1/1999 | Armetta et al. | | 5,970,482 A | 10/1999 | Pham |
| 5,864,871 A | 1/1999 | Kitain et al. | | 5,970,483 A | 10/1999 | Evans |
| RE36,116 E | 2/1999 | McCarthy | | 5,978,467 A | 11/1999 | Walker et al. |
| 5,866,889 A | 2/1999 | Weiss et al. | | 5,982,370 A | 11/1999 | Kamper |
| 5,870,456 A | 2/1999 | Rogers | | 5,983,196 A | 11/1999 | Wendkos |
| 5,870,718 A | 2/1999 | Spector | | 5,987,434 A | 11/1999 | Libman |
| 5,870,724 A | 2/1999 | Lawlor | | 5,987,454 A | 11/1999 | Hobbs |
| 5,870,725 A | 2/1999 | Belinger et al. | | 5,987,498 A | 11/1999 | Athing et al. |
| 5,871,398 A | 2/1999 | Schneier et al. | | 5,991,736 A | 11/1999 | Ferguson et al. |
| 5,873,072 A | 2/1999 | Kight | | 5,991,738 A | 11/1999 | Ogram |
| 5,873,096 A | 2/1999 | Lim | | 5,991,748 A | 11/1999 | Taskett |
| 5,878,403 A | 3/1999 | DeFrancesco et al. | | 5,991,751 A | 11/1999 | Rivette et al. |
| 5,880,769 A | 3/1999 | Nemirofsky | | 5,991,780 A | 11/1999 | Rivette |
| 5,883,810 A | 3/1999 | Franklin et al. | | 5,995,948 A | 11/1999 | Whitford |
| 5,884,032 A | 3/1999 | Bateman | | 5,995,976 A | 11/1999 | Walker et al. |
| 5,884,270 A | 3/1999 | Walker et al. | | 5,999,596 A | 12/1999 | Walker et al. |
| 5,884,272 A | 3/1999 | Walker et al. | | 5,999,907 A | 12/1999 | Donner |
| 5,884,274 A | 3/1999 | Walker et al. | | 5,999,971 A | 12/1999 | Buckland |
| 5,884,288 A | 3/1999 | Chang | | 6,000,033 A | 12/1999 | Kelley et al. |
| 5,889,863 A | 3/1999 | Weber | | 6,001,016 A | 12/1999 | Walker et al. |
| 5,892,900 A | 4/1999 | Ginter et al. | | 6,003,762 A | 12/1999 | Hayashida |

| Patent | Date | Inventor | Patent | Date | Inventor |
|---|---|---|---|---|---|
| 6,005,939 A | 12/1999 | Fortenberry et al. | 6,134,592 A | 10/2000 | Montulli |
| 6,006,205 A | 12/1999 | Loeb et al. | 6,135,349 A | 10/2000 | Zirkel |
| 6,006,249 A | 12/1999 | Leong | 6,138,106 A | 10/2000 | Walker et al. |
| 6,009,415 A | 12/1999 | Shurling et al. | 6,138,118 A | 10/2000 | Koppstein et al. |
| 6,009,442 A | 12/1999 | Chen et al. | 6,141,651 A | 10/2000 | Riley |
| 6,010,404 A | 1/2000 | Walker et al. | 6,141,666 A | 10/2000 | Tobin |
| 6,012,088 A | 1/2000 | Li et al. | 6,144,946 A | 11/2000 | Iwamura |
| 6,012,983 A | 1/2000 | Walker et al. | 6,144,948 A | 11/2000 | Walker et al. |
| 6,014,439 A | 1/2000 | Walker et al. | 6,145,086 A | 11/2000 | Bellemore et al. |
| 6,014,635 A | 1/2000 | Harris et al. | 6,148,293 A | 11/2000 | King |
| 6,014,636 A | 1/2000 | Reeder | 6,151,584 A | 11/2000 | Papierniak et al. |
| 6,014,638 A | 1/2000 | Burge et al. | 6,154,750 A | 11/2000 | Roberge et al. |
| 6,014,641 A | 1/2000 | Loeb et al. | 6,154,879 A | 11/2000 | Pare et al. |
| 6,014,645 A | 1/2000 | Cunningham | 6,161,113 A | 12/2000 | Mora et al. |
| 6,016,476 A | 1/2000 | Maes et al. | 6,161,182 A | 12/2000 | Nadooshan |
| 6,016,810 A | 1/2000 | Ravenscroft | 6,164,533 A | 12/2000 | Barton |
| 6,018,714 A | 1/2000 | Risen, Jr. | 6,170,011 B1 | 1/2001 | Beck et al. |
| 6,018,718 A | 1/2000 | Walker et al. | 6,178,511 B1 | 1/2001 | Cohen et al. |
| 6,024,640 A | 2/2000 | Walker et al. | 6,182,052 B1 | 1/2001 | Fulton et al. |
| 6,026,398 A | 2/2000 | Brown et al. | 6,182,142 B1 | 1/2001 | Win et al. |
| 6,026,429 A | 2/2000 | Jones et al. | 6,182,220 B1 | 1/2001 | Chen et al. |
| 6,032,134 A | 2/2000 | Weissman | 6,182,225 B1 | 1/2001 | Hagiuda et al. |
| 6,032,136 A | 2/2000 | Brake, Jr. et al. | 6,185,242 B1 | 2/2001 | Arthur et al. |
| 6,032,147 A | 2/2000 | Williams et al. | 6,185,542 B1 | 2/2001 | Moran et al. |
| 6,038,547 A | 3/2000 | Casto | 6,189,029 B1 | 2/2001 | Fuerst |
| 6,038,552 A | 3/2000 | Fleischl et al. | 6,193,154 B1 | 2/2001 | Phillips et al. |
| 6,042,006 A | 3/2000 | Van Tilburg et al. | 6,195,644 B1 | 2/2001 | Bowie |
| 6,044,362 A | 3/2000 | Neely | 6,199,077 B1 | 3/2001 | Inala et al. |
| 6,045,039 A | 4/2000 | Stinson et al. | 6,201,948 B1 | 3/2001 | Cook et al. |
| 6,049,778 A | 4/2000 | Walker et al. | 6,202,005 B1 | 3/2001 | Mahaffey |
| 6,049,782 A | 4/2000 | Gottesman et al. | 6,202,054 B1 | 3/2001 | Lawlor et al. |
| 6,049,835 A | 4/2000 | Gagnon | 6,202,066 B1 | 3/2001 | Barkley |
| 6,055,637 A | 4/2000 | Hudson et al. | 6,202,151 B1 | 3/2001 | Musgrave et al. |
| 6,061,665 A | 5/2000 | Bahreman | 6,202,158 B1 | 3/2001 | Urano et al. |
| 6,064,987 A | 5/2000 | Walker et al. | 6,208,978 B1 | 3/2001 | Walker et al. |
| 6,065,120 A | 5/2000 | Laursen et al. | 6,208,984 B1 | 3/2001 | Rosenthal |
| 6,065,675 A | 5/2000 | Teicher | 6,216,115 B1 | 4/2001 | Barrameda et al. |
| 6,067,531 A | 5/2000 | Hoyt et al. | 6,219,639 B1 | 4/2001 | Bakis et al. |
| 6,070,147 A | 5/2000 | Harms et al. | 6,219,706 B1 | 4/2001 | Fan |
| 6,070,153 A | 5/2000 | Simpson | 6,222,914 B1 | 4/2001 | McMullin |
| 6,070,244 A | 5/2000 | Orchier et al. | 6,223,168 B1 | 4/2001 | McGurl et al. |
| 6,073,105 A | 6/2000 | Sutcliffe et al. | 6,226,623 B1 | 5/2001 | Schein et al. |
| 6,073,113 A | 6/2000 | Guinan | 6,226,679 B1 | 5/2001 | Gupta |
| 6,075,519 A | 6/2000 | Okatani et al. | 6,226,752 B1 | 5/2001 | Gupta et al. |
| 6,076,072 A | 6/2000 | Libman | 6,227,447 B1 | 5/2001 | Campisano |
| 6,081,790 A | 6/2000 | Rosen | 6,230,148 B1 | 5/2001 | Pare et al. |
| 6,081,810 A | 6/2000 | Rosenzweig et al. | 6,243,688 B1 | 6/2001 | Kalina |
| 6,081,900 A | 6/2000 | Subramaniam et al. | 6,243,816 B1 | 6/2001 | Fang et al. |
| 6,085,168 A | 7/2000 | Mori et al. | 6,253,327 B1 | 6/2001 | Zhang et al. |
| 6,088,444 A | 7/2000 | Walker et al. | 6,253,328 B1 | 6/2001 | Smith, Jr. |
| 6,088,451 A | 7/2000 | He et al. | 6,256,664 B1 | 7/2001 | Donoho et al. |
| 6,088,683 A | 7/2000 | Jalili | 6,260,026 B1 | 7/2001 | Tomida et al. |
| 6,088,686 A | 7/2000 | Walker et al. | 6,266,648 B1 | 7/2001 | Baker |
| 6,088,700 A | 7/2000 | Larsen et al. | 6,266,683 B1 | 7/2001 | Yehuda et al. |
| 6,091,817 A | 7/2000 | Bertina et al. | 6,267,292 B1 | 7/2001 | Walker et al. |
| 6,092,192 A | 7/2000 | Kanevsky et al. | 6,269,348 B1 | 7/2001 | Pare et al. |
| 6,092,196 A | 7/2000 | Reiche | 6,275,944 B1 | 8/2001 | Kao et al. |
| 6,095,412 A | 8/2000 | Bertina et al. | 6,289,322 B1 | 9/2001 | Kitchen et al. |
| 6,098,070 A | 8/2000 | Maxwell | 6,298,330 B1 | 10/2001 | Gardenswartz et al. |
| 6,101,486 A | 8/2000 | Roberts et al. | 6,298,356 B1 | 10/2001 | Jawahar et al. |
| 6,104,716 A | 8/2000 | Crichton et al. | 6,301,567 B1 | 10/2001 | Leong et al. |
| 6,105,012 A | 8/2000 | Chang et al. | 6,308,273 B1 | 10/2001 | Goertzel et al. |
| 6,105,865 A | 8/2000 | Hardesty | 6,308,274 B1 | 10/2001 | Swift |
| 6,111,858 A | 8/2000 | Greaves et al. | 6,311,275 B1 | 10/2001 | Jin et al. |
| 6,112,181 A | 8/2000 | Shear et al. | 6,317,834 B1 | 11/2001 | Gennaro et al. |
| 6,115,642 A | 9/2000 | Brown et al. | 6,317,838 B1 | 11/2001 | Baize |
| 6,115,690 A | 9/2000 | Wong | 6,324,524 B1 | 11/2001 | Lent et al. |
| 6,119,093 A | 9/2000 | Walker et al. | 6,327,573 B1 | 12/2001 | Walker et al. |
| 6,119,099 A | 9/2000 | Walker et al. | 6,327,578 B1 | 12/2001 | Linehan |
| 6,128,599 A | 10/2000 | Walker et al. | 6,330,543 B1 | 12/2001 | Kepecs |
| 6,128,602 A | 10/2000 | Northington et al. | 6,332,192 B1 | 12/2001 | Boroditsky et al. |
| 6,131,810 A | 10/2000 | Weiss et al. | 6,336,104 B1 | 1/2002 | Walker et al. |
| 6,134,549 A | 10/2000 | Regnier et al. | 6,339,423 B1 | 1/2002 | Sampson et al. |

| Patent | Date | Inventor |
|---|---|---|
| 6,343,279 B1 | 1/2002 | Bissonette et al. |
| 6,343,323 B1 | 1/2002 | Kalpio et al. |
| 6,345,261 B1 | 2/2002 | Feidelson et al. |
| 6,349,242 B2 | 2/2002 | Mahaffey |
| 6,349,336 B1 | 2/2002 | Sit et al. |
| 6,366,682 B1 | 4/2002 | Hoffman et al. |
| 6,381,587 B1 | 4/2002 | Guzelsu |
| 6,385,591 B1 | 5/2002 | Mankoff |
| 6,385,652 B1 | 5/2002 | Brown et al. |
| 6,401,125 B1 | 6/2002 | Makarios et al. |
| 6,401,211 B1 | 6/2002 | Brezak, Jr. et al. |
| 6,408,389 B2 | 6/2002 | Grawrock et al. |
| 6,411,933 B1 | 6/2002 | Maes et al. |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,446,053 B1 | 9/2002 | Elliott |
| 6,449,765 B1 | 9/2002 | Ballard |
| 6,453,353 B1 | 9/2002 | Win et al. |
| 6,460,141 B1 | 10/2002 | Olden |
| 6,470,357 B1 | 10/2002 | Garcia, Jr. et al. |
| 6,484,149 B1 | 11/2002 | Jammes et al. |
| 6,487,641 B1 | 11/2002 | Cusson et al. |
| 6,490,601 B1 | 12/2002 | Markus et al. |
| 6,493,677 B1 | 12/2002 | von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,498,657 B1 | 12/2002 | Kuntz et al. |
| 6,507,912 B1 | 1/2003 | Matyas, Jr. et al. |
| 6,510,523 B1 | 1/2003 | Perlman et al. |
| 6,519,763 B1 | 2/2003 | Kaufer et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,580,814 B1 | 6/2003 | Ittycheriah et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,589,291 B1 | 7/2003 | Boag et al. |
| 6,592,044 B1 | 7/2003 | Wong et al. |
| 6,594,640 B1 | 7/2003 | Postrel |
| 6,609,106 B1 | 8/2003 | Robertson |
| 6,609,113 B1 | 8/2003 | O'Leary et al. |
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,640,302 B1 | 10/2003 | Subramaniam et al. |
| 6,668,322 B1 | 12/2003 | Wood et al. |
| 6,671,818 B1 | 12/2003 | Mikurak |
| 6,675,261 B2 | 1/2004 | Shandony |
| 6,684,248 B1 | 1/2004 | Janacek et al. |
| 6,684,384 B1 | 1/2004 | Bickerton et al. |
| 6,687,222 B1 | 2/2004 | Albert et al. |
| 6,687,245 B2 | 2/2004 | Fangman et al. |
| 6,697,947 B1 | 2/2004 | Matyas, Jr. et al. |
| 6,714,987 B1 | 3/2004 | Amin et al. |
| 6,718,388 B1 | 4/2004 | Yarborough |
| 6,718,482 B2 | 4/2004 | Sato et al. |
| 6,718,535 B1 | 4/2004 | Underwood |
| 6,725,269 B1 | 4/2004 | Megiddo |
| 6,735,695 B1 | 5/2004 | Gopalakrishnan et al. |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,763,388 B1 | 7/2004 | Tsimelzon |
| 6,766,370 B2 | 7/2004 | Glommen et al. |
| 6,769,605 B1 | 8/2004 | Magness |
| 6,772,146 B2 | 8/2004 | Khemlani et al. |
| 6,785,810 B1 | 8/2004 | Lirov et al. |
| 6,789,115 B1 | 9/2004 | Singer et al. |
| 6,792,572 B1 | 9/2004 | Frohlick |
| 6,805,288 B2 | 10/2004 | Routhenstein et al. |
| 6,810,395 B1 | 10/2004 | Bharat |
| 6,819,219 B1 | 11/2004 | Bolle et al. |
| 6,820,061 B2 | 11/2004 | Postrel |
| 6,820,202 B1 | 11/2004 | Wheeler et al. |
| 6,826,696 B1 | 11/2004 | Chawla et al. |
| 6,829,586 B2 | 12/2004 | Postrel |
| 6,832,202 B1 | 12/2004 | Schuyler et al. |
| 6,832,587 B2 | 12/2004 | Wampula et al. |
| 6,842,739 B2 | 1/2005 | Postrel |
| 6,847,991 B1 | 1/2005 | Kurapati |
| 6,856,970 B1 | 2/2005 | Campbell et al. |
| 6,868,391 B1 | 3/2005 | Hultgren |
| 6,892,231 B2 | 5/2005 | Jager |
| 6,907,566 B1 | 6/2005 | McElfresh et al. |
| 6,925,481 B2 | 8/2005 | Singhal et al. |
| 6,934,848 B1 | 8/2005 | King et al. |
| 6,937,976 B2 | 8/2005 | Apte |
| 6,938,158 B2 | 8/2005 | Azuma |
| 6,947,898 B2 | 9/2005 | Postrel |
| 6,950,936 B2 | 9/2005 | Subramaniam et al. |
| 6,954,932 B2 | 10/2005 | Nakamura et al. |
| 6,957,337 B1 | 10/2005 | Chainer et al. |
| 6,965,939 B2 | 11/2005 | Cuomo et al. |
| 6,976,164 B1 | 12/2005 | King et al. |
| 6,980,962 B1 | 12/2005 | Arganbright et al. |
| 6,983,421 B1 | 1/2006 | Lahti et al. |
| 6,992,786 B1 | 1/2006 | Breding et al. |
| 7,006,983 B1 | 2/2006 | Packes et al. |
| 7,010,512 B1 | 3/2006 | Gillin et al. |
| 7,020,696 B1 | 3/2006 | Perry et al. |
| 7,032,110 B1 | 4/2006 | Su et al. |
| 7,051,199 B1 | 5/2006 | Berson et al. |
| 7,051,330 B1 | 5/2006 | Kaler et al. |
| 7,058,817 B1 | 6/2006 | Ellmore |
| 7,076,453 B1 | 7/2006 | Jammes et al. |
| 7,080,036 B1 | 7/2006 | Drummond et al. |
| 7,089,203 B1 | 8/2006 | Crookshanks |
| 7,089,208 B1 | 8/2006 | Levchin et al. |
| 7,089,503 B1 | 8/2006 | Bloomquist et al. |
| 7,093,020 B1 | 8/2006 | McCarty et al. |
| 7,093,282 B2 | 8/2006 | Hillhouse |
| 7,103,556 B2 | 9/2006 | Del Rey et al. |
| 7,117,239 B1 | 10/2006 | Hansen |
| 7,124,101 B1 | 10/2006 | Mikurak |
| 7,134,075 B2 | 11/2006 | Hind |
| 7,137,006 B1 | 11/2006 | Grandcolas et al. |
| 7,139,686 B1 | 11/2006 | Critz |
| 7,185,094 B2 | 2/2007 | Marquette et al. |
| 7,188,181 B1 | 3/2007 | Squier et al. |
| 7,191,952 B2 | 3/2007 | Blossom |
| 7,197,470 B1 | 3/2007 | Arnett |
| 7,203,909 B1 | 4/2007 | Horvitz et al. |
| 7,299,201 B2 | 11/2007 | Jammes |
| 7,321,864 B1 | 1/2008 | Gendler |
| 7,370,011 B2 | 5/2008 | Bennett |
| 7,392,222 B1 | 6/2008 | Hamilton |
| 7,401,731 B1 | 7/2008 | Pletz |
| 7,526,449 B1 | 4/2009 | Blossom |
| 2001/0011255 A1 | 8/2001 | Asay et al. |
| 2001/0012974 A1 | 8/2001 | Mahaffey |
| 2001/0016835 A1 | 8/2001 | Hansmann et al. |
| 2001/0027474 A1 | 10/2001 | Nachman et al. |
| 2001/0029464 A1 | 10/2001 | Schweitzwer |
| 2001/0032184 A1 | 10/2001 | Tenembaum |

| | | |
|---|---|---|
| 2001/0047295 A1 | 11/2001 | Tenembaum |
| 2001/0051917 A1 | 12/2001 | Bissonette et al. |
| 2001/0054003 A1 | 12/2001 | Chien et al. |
| 2001/0054059 A1 | 12/2001 | Marks et al. |
| 2002/0002479 A1 | 1/2002 | Almog et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023108 A1 | 2/2002 | Daswani et al. |
| 2002/0029269 A1 | 3/2002 | McCarty et al. |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0069172 A1 | 6/2002 | Omshehe et al. |
| 2002/0077964 A1 | 6/2002 | Brody et al. |
| 2002/0077978 A1 | 6/2002 | O'Leary et al. |
| 2002/0087447 A1 | 7/2002 | McDonald et al. |
| 2002/0087471 A1 | 7/2002 | Ganesan et al. |
| 2002/0095443 A1 | 7/2002 | Kovack |
| 2002/0099826 A1 | 7/2002 | Summers et al. |
| 2002/0099936 A1 | 7/2002 | Kou et al. |
| 2002/0104006 A1 | 8/2002 | Boate et al. |
| 2002/0104017 A1 | 8/2002 | Stefan |
| 2002/0107788 A1 | 8/2002 | Cunningham |
| 2002/0143874 A1 | 10/2002 | Marquette et al. |
| 2002/0152163 A1 | 10/2002 | Bezos et al. |
| 2002/0156900 A1 | 10/2002 | Marquette et al. |
| 2002/0165949 A1 | 11/2002 | Na |
| 2002/0174010 A1 | 11/2002 | Rice, III |
| 2002/0178113 A1* | 11/2002 | Clifford et al. .......... 705/39 |
| 2002/0184507 A1 | 12/2002 | Makower et al. |
| 2002/0188869 A1 | 12/2002 | Patrick |
| 2002/0191548 A1 | 12/2002 | Ylonen et al. |
| 2002/0198806 A1 | 12/2002 | Blagg et al. |
| 2003/0001888 A1 | 1/2003 | Power |
| 2003/0018915 A1 | 1/2003 | Stoll |
| 2003/0023880 A1 | 1/2003 | Edward et al. |
| 2003/0034388 A1 | 2/2003 | Routhenstein et al. |
| 2003/0037131 A1 | 2/2003 | Verma |
| 2003/0037142 A1 | 2/2003 | Munger et al. |
| 2003/0040995 A1 | 2/2003 | Daddario et al. |
| 2003/0041165 A1 | 2/2003 | Spencer et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0055871 A1 | 3/2003 | Roses |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0149594 A1 | 8/2003 | Beazley et al. |
| 2003/0154171 A1 | 8/2003 | Karp et al. |
| 2003/0154403 A1 | 8/2003 | Keinsley et al. |
| 2003/0159072 A1 | 8/2003 | Bellinger et al. |
| 2003/0163700 A1 | 8/2003 | Paatero |
| 2003/0163733 A1 | 8/2003 | Barriga-Caceres et al. |
| 2003/0167229 A1 | 9/2003 | Ludwig et al. |
| 2003/0177067 A1 | 9/2003 | Cowell et al. |
| 2003/0191549 A1 | 10/2003 | Otsuka et al. |
| 2003/0204460 A1 | 10/2003 | Robinson et al. |
| 2003/0225688 A1 | 12/2003 | Dobbins |
| 2004/0031856 A1 | 2/2004 | Atsmon et al. |
| 2004/0049702 A1 | 3/2004 | Subramaniam et al. |
| 2004/0117409 A1 | 6/2004 | Scahill et al. |
| 2004/0153378 A1 | 8/2004 | Perkowski |
| 2004/0215514 A1 | 10/2004 | Quinlan et al. |
| 2004/0254991 A1 | 12/2004 | Malik et al. |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0091126 A1 | 4/2005 | Junger |
| 2005/0120180 A1 | 6/2005 | Schornbach et al. |
| 2005/0193056 A1 | 9/2005 | Schaefer et al. |
| 2005/0278641 A1 | 12/2005 | Mansour et al. |
| 2006/0029261 A1 | 2/2006 | Hoffman et al. |
| 2006/0116949 A1 | 6/2006 | Wehunt et al. |
| 2006/0274970 A1 | 12/2006 | Seki et al. |
| 2007/0118470 A1 | 5/2007 | Warren |
| 2008/0288396 A1 | 11/2008 | Siggers |

FOREIGN PATENT DOCUMENTS

| | | |
|---|---|---|
| DE | 19731293 | 1/1999 |
| EP | 0855659 | 7/1998 |
| EP | 0884877 | 12/1998 |
| EP | 0917119 | 5/1999 |
| EP | 1014318 A2 | 6/2000 |
| EP | 1022664 | 7/2000 |
| EP | 1056043 | 11/2000 |
| EP | 1089516 | 4/2001 |
| JP | H10187467 | 7/1998 |
| JP | 2000324329 | 11/2000 |
| JP | 2001134672 | 5/2001 |
| JP | 2005242976 | 9/2005 |
| WO | WO 97/43736 | 11/1997 |
| WO | WO 99/40507 A1 | 8/1999 |
| WO | WO 99/52051 | 10/1999 |
| WO | WO 00/68858 | 11/2000 |
| WO | WO 01/18656 A1 | 3/2001 |
| WO | WO 01/35355 | 5/2001 |
| WO | WO 01/43084 | 6/2001 |
| WO | WO 0188659 | 11/2001 |
| WO | WO 02/17082 A1 | 2/2002 |
| WO | WO 2004/079603 | 9/2004 |

OTHER PUBLICATIONS

Kutler, A Different Drummer on the Data Highway, American Banker, Section: No. 91, vol. 160, May 12, 1995, p. 14.

Epper, A Player Goes After Big Bucks in Cyberspace, American Banker, vol. 160, No. 86, ISSN: 0002-7561, May 5, 1995, p. 17.

Berry et al., A potent new tool for selling databse, Business Week, Cover Story, Sep. 5, 1994, pp. 56-62.

Applets, java.sun.com, May 21, 1999.

Associates National Bank (DE) Credit Card, The Associates, www.theassociates.com/consumer/credit_cards/main.html, Apr. 6, 1999, 6 pages.

At Your Request, www.wingspanbank.com, Sep. 28, 1999.

Anonymous, Aversion Therapy: Banks Overcoming Fear of the 'Net to Develop Safe Internet-based Payment System w/ Netscape Communicator, Network World, ISSN: 0887-7661, Dec. 12, 1994.

Java, Banking on JAVA(TM) Technology, java.sun.com, May 21, 1999.

Bechtel Construction Operations Incorporated Standardizes on Primavera's Expedition Contract Management Software, Business Wire, Jul. 27, 1999.

Anonymous, CORBA Overview, arch2.htm at pent21.infosys.tuwien.ac.at, May 25, 1999.

Vandenengel, Cards on the Internet: Advertising on a $3 Bill, Industry Intelligence, Feb. 1, 1995, pp. 46-48.

Kutler, Cash Card Creator Looking Beyond Mondex, Feb. 9, 1995.

Bank, Cash, Check,Charge—What's Next?, Seattle Times, Mar. 6, 1995.

Marlin, Chasing Document Management, Inform, vol. 13, No. 4, Apr. 199, p. 76-82.

Consortium Created to Manage Common Electronic Purse Specifications, http://www.visa.com/av/news/PRmisc051199.vhtml, printed Feb. 23, 2001.
Construction Financing to Build Your Own Home, ISBN: 0962864307, Jul. 1990.
Civitello Jr., Construction Operations Manual of Policies and Procedures, Third Edition, 2000.
Marchman, Construction Scheduling with Primavera Project Planner, May 25, 1999.
Chester, Cross-platform integration with XML and SOAP, IT PTO 09/—Oct. 2001.
Mitchell, Cyberspace: Crafting Software . . . , Business Week, Feb. 27, 1999, pp. 78-86.
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise Javabeans(TM) Technology: Server Component Model for the Java(TM) platform, java.sun.com, May 2, 1999.
Maize, Fannie Mae on the Web, Doucment ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p241047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
Radosevich, Is Work Flow Working?, CNN.com, Apr. 6, 1999 at <http://www.cnn.com/TECH/computing/9904/06/workflow/ent.idg, p. 1 of 5, retrieved from the internet on Nov. 28, 2005.
Java, Java (TM) Technology in the Real World, java.sun.com, May 21, 1999.
Java, Java(TM) Remote Method Invocation (RMI) Interface, java.sun.com, 05/32/1999.
Java, Java(TM) Servlet API, java.sun.com, May 21, 1999.
OMG, Library, www.omg.com, May 25, 1999.
Mary C. Lacity, et al., Mary C. Lacity, et al., The Information Systems Outsourcing Bandwagon, Sloan Management Review, vol. 35, No. 1, Fall 1993, p. 73-86.
Method of Protecting Data on A Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, WSJ B9.
Sirbu, et al, NetBill: An Internet Commerce System Optimized for Network Delivered Services, printed on Feb. 27, 1995.
Mitchell, Netlink Goes After an Unbanked Niche, Card Technology, ISSN: 1093-1279, Sep. 1999, p. 22.
Barnham, Network Brings Together Producers and Companies, Document ID: 17347.
Houlder, OFT Gives the Individual Top Priority: Report Calls for Deregulation of Business Lending, Document ID: 91716, Jun. 8, 1994.
Omware, Inc., Web Pages, Feb. 2000, Retrieved from http://web.archive.org/web20000226033405/www.omware.com/products.html, Retrieved from the interneet on Nov. 28, 2005.
Anonymous, Overview of CORBA, May 25, 1999.
Harris, Planning Using Primavera Project Planner P3 Version 3.0, User Guide, Copyright 1999 by Eastwood Harry Pty Ltd., 1999.
Point for Windows Version 3.x Interface Marketing Guide.pdf.
Johnston, Pondering Passport: Do You Trust Microsoft With Your Data?, www.pcworld.com/resource/printable/article/0.aid,63244,00.asp, Sep. 24, 2001.
Primavera Systems, Inc.—How the World Manages Projects, EXpedition Contract Control Software, www.primavera.com, Jun. 23, 2005.

Primavera and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, SOAP Cleans up interoperability problems on the web, IT PTO, Jan./Feb. 2001.
Safe Single-Sign-On Protocol with Minimal Password Exposure No Decryption and Technology Adaptivity, IBM Corporation, TDB 03-95, Order 95A, Mar. 1, 1995, pp. 245-248.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Servlet/Applet/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Thomas Publishing Company, SoluSource: For Engineers By Engineers, Thomas Publishing Company, Apr. 26, 1999.
Java, Staying in Touch with JNDI, java.sun.com, May 21, 1999.
Summary of The At Your Request Architecture, First USA Bank Confidential and Proprietary, Apr. 2, 1999, pp. 1-8.
Temporary Global Passwords, IBM Corporation, IBM TDB v36, n3, 03-93, Order 93A 60636, Mar. 1, 1993, pp. 451-454.
Java, The JDBC(TM) Data Access API, java.sun.com, May 21, 1999.
Carden, Philip, The New Face of Single Sign-on, Network Computing, http://www.networkcomputing.com, printed Dec. 29, 2000, 4 pages.
The check is in the email, Information Today, vol. 12, No. 3, ISSN: 8755-6286, 03/01995.
Thomas Publishing Company, ThomasNet, Apr. 26, 1999.
Ritz, Total Construction Project Management, McGraw-Hill, 1994.
Hewlett-Packard Company, Understanding Product Data Management, Hewlett-Packard Company.
Welcome to MUSE, Apr. 26, 1999.
OMG, Welcome to OMG's CORBA for Beginners Page!, www.omg.co, May 25, 1999.
OMG, What is CORBA?, www.omg.com, May 25, 1999.
Fujimura et al., XML Voucher: Generic Voucher Language, Feb. 2003.
eCharge, eCharge Corporation, www.echarge.com, Dec. 3, 1999.
PCT—International Search Report dated Sep. 23, 2003 for Application No. PCT/US02/34870, filed Oct. 31, 2002.
"Accucard and Entranet Bank on Personal Touch," *New Media Age*, Aug. 30, 2001, Copyright 2001 Centuar Communications Ltd. (1 page).
"Accucard Develops the First Tailored Credit Card with Help from Experian," *M2 Presswire*, Jul. 30, 2002, Copyright 2002 M2 Communications Ltd. (2 pages).
"Accucard Pioneers Personalised Online Credit Cards in UK," *Cards International*, Sep. 12, 2001, Copyright 2001 Laffetly Publications Limited (2 pages).
Anderson, "EasyJet Founder to Offer Personal Financial Services, FT Says," *Bloomberg News*, Aug. 20, 2001, Copyright 2001 Bloomberg L.P. (1 page).
Burridge, "Personalised Credit Card Launched," *Press Association*, Aug. 21, 2002, Copyright 2001 The Press Association Ltd. (1 page).
Burridge, "Personalised Credit Card Set for Launch," *Personal Finance Correspondent*, PA News, Aug. 20, 2001, Copyright 2001 The Press Association Limited (1 page).
"Cheap Plastic for the 'Cherry Picked': Credit Cards: The First Credit Card to Let You Choose Your Own Interest Rate is Available . . . ,"

*Financial Times* (London), Aug. 25, 2001, Saturday London Edition 1, Copyright 2001 The Financial Times Limited (2 pages).
"Citigroup Personalises New Card Launch," *Bank Marketing International*, Dec. 12, 2001, Copyright 2001 Lafferty Publication Limited (1 page).
"Customization and Choice Strategy" (Redacted internal bank document), First USA, Sep. 25, 2001 (9 pages).
"Easy Brand to Move Into Cards World," *Bank Marketing International*, Sep. 24, 2001, Copyright 2001 Lafferty Publications Limited (1 page).
"EasyGroup Breaks into Cards Business Via Online Offering," *Cards International*, Sep. 12, 2001, Copyright Lafferty Publications Unlimited (1 page).
"EasyJet Boss Launching New Credit Card Service," *Daily Post* (Liverpool), Aug. 22, 2001, The Liverpool Daily Post & Echo Ltd. (1 page).
"Easymoney.com Launches with Personalised Credit Card," New Media Age, Aug. 23, 2001, Copyright 2001 Centuar Communication Ltd. (1 page).
"Experian Delivers 'Lifetime Value' Test," Cards International, Aug. 15, 2002, Copyright 2002 Lafferty Publications Limited (1 page).
"Experian Wins Accucard and the Associates Contracts," Bank Marketing International, Aug. 13, 2002, Copyright 2002 Lafferty Publications Limited (2 pages).
"First USA Launches 'Customizable' Visa Card," DMNews.com, Apr. 17, 2002 (1 page).
"First USA Tests New Card," *Cardline*, vol. 2; No. 14; p. 1, Apr. 2002, Copyright 2002 American Banker-Bond Buyer (1 page).
Hills-Cosgrove, "Take the Easy Option on Credit," *The Scotsman*, Aug. 22, 2001, Copyright 2001 The Scotsman Publication Ltd. (1 page).
Johnson, "Credit Card Wars," *Strategy*, Oct. 7, 2002, Copyright 2002 Brunico Communications, Inc. (4 pages).
Kuykendall, "Citi Makes Quiet Entry into Chip Card Arena," *The American Banker*, Dec. 3, 2001 (2 pages).
"Life Finance Brings Style to Banking," *Bank Marketing International*, Jul. 17, 2002, Copyright 2002 Lafferty Publications Limited (2 pages).
MacFarlane, "Gay Credit Cards Aim at Pink Pound," *Business*, Oct. 29, 2001, Copyright 2001 NewsQuest Media Group Limited (1 page).
MacKintosh, "EasyJet Founder in Alliance to Launch Online Credit Card," *Financial Times* (London), Aug. 21, 2001, Copyright the Financial Times Limited (1 page).
Makos, "Thriving When It Should Have Failed," Credit Card Management, May 2001, Copyright 2001 American Banker-Bond Buyer (4 pages).
McKinley, "First USA Tests Card with Unprecedented Options," *Card Marketing*, vol. 6; No. 4; p. 10, May/Jun. 2002 (1 page).
Murray, "Cut Up Your Plastic . . . ," *The Daily Telegraph* (London), Oct. 27, 2001, p. 11, Copyright 2001 Telegraph Group Limited (2 pages).
"Pick-and-Choose Interest Rates," *Belfast News Letter*, Aug. 28, 2001, Copyright 2001 Century Newspapers Limited (1 page).
"Pick Your Own Rate of Interest," *Birmingham Post*, Aug. 25, 2001, Copyright 2001 Midland Independent Newspapers plc (1 page).
Ptacek, "Customer Niches, Affinity Links Buoy Web Banks." *The American Banker*, Sep. 21, 2001, Copyright 2001 American Banker, Inc. (3 pages).
Shaw, "Pick and Mix Your Credit Card . . . ," *The Daily Telegraph* (London), Sep. 22, 2002, Copyright 2002 Telegraph Group Limited (2 pages).
Treanor, "Easyjet Founder Pilots Online Credit Card," *The Guardian* (London), Aug. 22, 2001, Copyright 2001 Guardian Newspapers Limited (1 page).
"UK's Festive Debt Hangover," *Cards International*, Feb. 22, 2002, Copyright 2002 Lafferty Publications Limited (1 page).
"Virgin Card 'Is a Rip-Off'; He Copied Ours Say Rival Firm," *The Mirror*, Jan. 30, 2002, Copyright 2002 MGN Ltd. (2 pages).
Fusaro, Roberta, Builders Moving to Web tools Computerworld, Nov. 16, 1998, vol. 32, No. 46, pp. 51, 53.
Seibert, Paul, Facilities Planning & Design for Financial Institutions Bankline Publications, 1996, ISBN: 1-55738-780-X.
Owens, David, Facilities Planning & Relocation RSMeans, 1993, ISBN: 0-87629-281-3.
Larsen, Amy, Internet goes to Work for Builders, InterWeek, Nov. 16, 1998, Issue 741.
Frank, John N. Frank, Beyond Direct Mail, Credit Card Management, vol. 9, Iss. 5, Aug. 1996, 4pgs.
Van Collie, Shimon Craig, Problem Disbursement Control Needed Construction Loan Tool from PriMerit NewTrend.
Deckmyn, Dominique, San Francisco manages $45M project via web-based Service, Computerworld, Aug. 9, 1999, vol. 33, No. 32, p. 14.
Mosig, Richard, Software Review: the Construction Project Manager Cost Engineering, Jan. 1996, vol. 38, No. 1, pp. 7-8.
Hernandez, Tomas et al., Software Solutions Building Design & Construction, Nov. 1999, vol. 40, No. 11, pp. 38-40.
Taylor, Telecommunications Demand Analysis in Transition, Proceedings of the 31st Hawaii International Conference on System Sciences, vol. 5, Jan. 6-9, 1998, pp. 409-415.
Brown, Keith, The Builder's Revolution, Jan. 1998, 226 pages.
Cotts, David, The Facility Management Handbook Second Edition AMACM, 1998, ISBN: 0-8144-030-8.

\* cited by examiner

FIGURE 4

| HOME | CREDIT CARDS | ACCESSORIES | FINANCIAL PRODUCTS |
|---|---|---|---|

Search Feature [ ] [GO]

| | AFFILIATION | REWARDS | PRODUCT TYPE | COST |
|---|---|---|---|---|

Customized Product Recap

| Base | Core Feature: *Ohio State University* |
| 1 | Affiliation(s): |
| 2 | Rewards: |
| 3 | Cost: |
| 4 | Product Type: |
| 5 | Card Design: |
| 6 | Choose your payment due date: |

CONTINUE CUSTOMIZATION

APPLY

RECOMMEND

You have capped your annual fee at $100 | Edit | ○ $0　○ $50　(•) $100　○ show all

FIGURE 5

| HOME | CREDIT CARDS | ACCESSORIES | FINANCIAL PRODUCTS |
|---|---|---|---|

Search Feature [ ] [GO]

| | AFFILIATION | REWARDS | PRODUCT TYPE | COST |
|---|---|---|---|---|

Customized Product Recap

| Base | Core Feature: *Ohio State University* |
|---|---|
| 1 | Affiliation(s): *AAA* |
| 2 | Rewards: *United Airlines* |
| 3 | Cost: *Preferred Great Rate with Longer Low Introductory Rate* |
| 4 | Product Type: *Platinum* |
| 5 | Card Design: [ Ohio State / 12434 5678 9123 4567 / Joe Smith | Visa ] |
| 6 | Choose your payment due date: *July 19, 2001* |

[Continue Customization]
[Apply]
[Recommend]

| You have capped your annual fee at $100 | Edit | ○ $0 ○ $50 ● $100 ○ show all |

FIGURE 6

| HOME | CREDIT CARDS | ACCESSORIES | FINANCIAL PRODUCTS |
|---|---|---|---|

Search Feature [         ] [GO]

| | AFFILIATION | REWARDS | PRODUCT TYPE | COST |
|---|---|---|---|---|

Customize Your Product

[  4  ]   Accessorize -- customize additional card benefits

Your Visa automatically comes with the following benefits, but you can add extras at an additional cost, or delete the ones you don't need to lower your price

| STANDARD BENEFITS | | ADDITIONAL BENEFITS | |
|---|---|---|---|
| $1MMM travel accident | X | Purchase Protection | |
| Year-end Summary | X | Online bill pay | |
| Auto Rental Collision Coverage | X | Credit Life Insurance | |
| Emergency Airline Ticket Rep. | X | First Protect - Debt Deferment | |
| Warranty Manager Service | X | Quarterly Account Summary | |
| $3000 Lost Luggage Ins. | X | Other Rev. Service Products | |

[ Continue customizing card ]    [ Configure and cost ]

[ You have capped your annual fee at $100 ]  [ Edit ]   ○ $0   ○ $50   ● $100   ○ show all

SYSTEM AND METHOD FOR ESTABLISHING OR MODIFYING AN ACCOUNT WITH USER SELECTABLE TERMS

This application claims priority to U.S. Provisional application No. 60/330,871, filed Nov. 1, 2001, entitled "System and Method for Establishing or Modifying an Account with User Selectable Terms," which is hereby incorporated by reference to the extent not inconsistent with the present application.

FIELD OF THE INVENTION

The present invention relates generally to methods and systems for providing customized accounts to users, such as loan and deposit accounts, and more particularly to methods and systems for allowing a user to easily select a number of desired account terms or features and to open a customized account or to customize an existing account.

BACKGROUND OF THE INVENTION

Financial institutions which provide credit cards, debit cards, mortgages, brokerage accounts, and other types of accounts typically offer a number of different options for each type of account, each option having an associated set of terms or features. The terms or features may include, for example in the case of a credit card, the annual percentage rate (APR), the credit limit (also referred to as the "credit line"), the annual fee, the card design, and/or a rewards program. The account holder typically has no opportunity to negotiate or modify the terms of the account, but rather must accept the terms of an account as offered by the financial institution. If the account holder is dissatisfied with one or more of the terms, there is no effective means of modifying those terms. Accordingly, known methods and systems for providing accounts in some respects do not fully satisfy the account holders.

SUMMARY OF THE INVENTION

The present invention relates to systems and methods for allowing a user to easily customize the terms of an account such as a loan account, asset account, margin account, insurance account, or brokerage account. Exemplary embodiments of the invention allow the user to specify various preferred terms such as cost (e.g., APR and annual fee), rewards programs, card design, affiliates, credit line, servicing options, and payment options, among others. The financial services provider issuing the account, e.g., the issuing bank, may make the various available terms for the account easily accessible to the user, for example through an internet website, an automated phone system, a customer service representative, outbound voice messaging, or a paper or electronic document such as an offer brochure, letter, or email message, enabling the user to easily understand the options and specify his or her preferences. The customization systems and methods may be applied to the process of opening a new account or customizing an existing account. The ability to provide a system and method which allows a current account holder to easily update the terms of his or her account may be particularly advantageous for retaining current account holders and enhancing their satisfaction with the account.

According to one embodiment, the invention relates to a system and method of providing an account to a user comprising the steps of sending to the user a plurality of available account terms, wherein the plurality of available account terms are categorized into a plurality of categories of account terms, receiving from the user a selection of at least one of the available account terms, and providing the account based on the user's selection.

According to another embodiment, the invention relates to a system and method for modifying an existing account comprising the steps of receiving account identification information from an account holder, sending to the account holder at least a portion of the existing account terms, sending to the account holder a plurality of available account terms, and receiving from the account holder a selection of at least one of the available account terms.

According to yet another embodiment, the invention relates to a method of selecting an account comprising the steps of (a) sending to the user a plurality of categories of account terms, (b) receiving a selection from the user of a first one of the categories, (c) sending to the user a plurality of available account terms for the selected category, (d) receiving from the user a selection of an available account term in the selected category, (e) repeating steps (b), (c), and (d) for at least a second category, and (f) matching the user's selections to a predefined account.

Other embodiments of the invention relate to systems and methods for allowing a user to select desired cost terms such as annual fee and APR, and for providing the user with information on other terms or benefits which are available based on the selected cost terms.

Still other embodiments of the invention relate to systems and methods for allowing the user to select such terms as credit limit, which may be fixed or which may vary based on the circumstances and characteristics of the transaction, affiliates, rewards programs, and other benefits and services.

The invention also relates to an article of manufacture which comprises a computer usable medium having computer readable program code means embodied therein for causing a computer to execute the methods described herein relating to establishing or modifying an account. The invention also relates to a system comprising a computer which is programmed to carry out the methods described herein.

BRIEF DESCRIPTION OF THE DRAWINGS

FIG. 4 is an example of a graphical user interface which may be displayed on a computer in connection with exemplary embodiments of the invention;

FIG. 5 is another example of a graphical user interface which may be displayed on a computer in connection with exemplary embodiments of the invention;

FIG. 6 is another example of a graphical user interface which may be displayed on a computer in connection with exemplary embodiments of the invention;

DETAILED DESCRIPTION OF THE INVENTION

Figure 1:
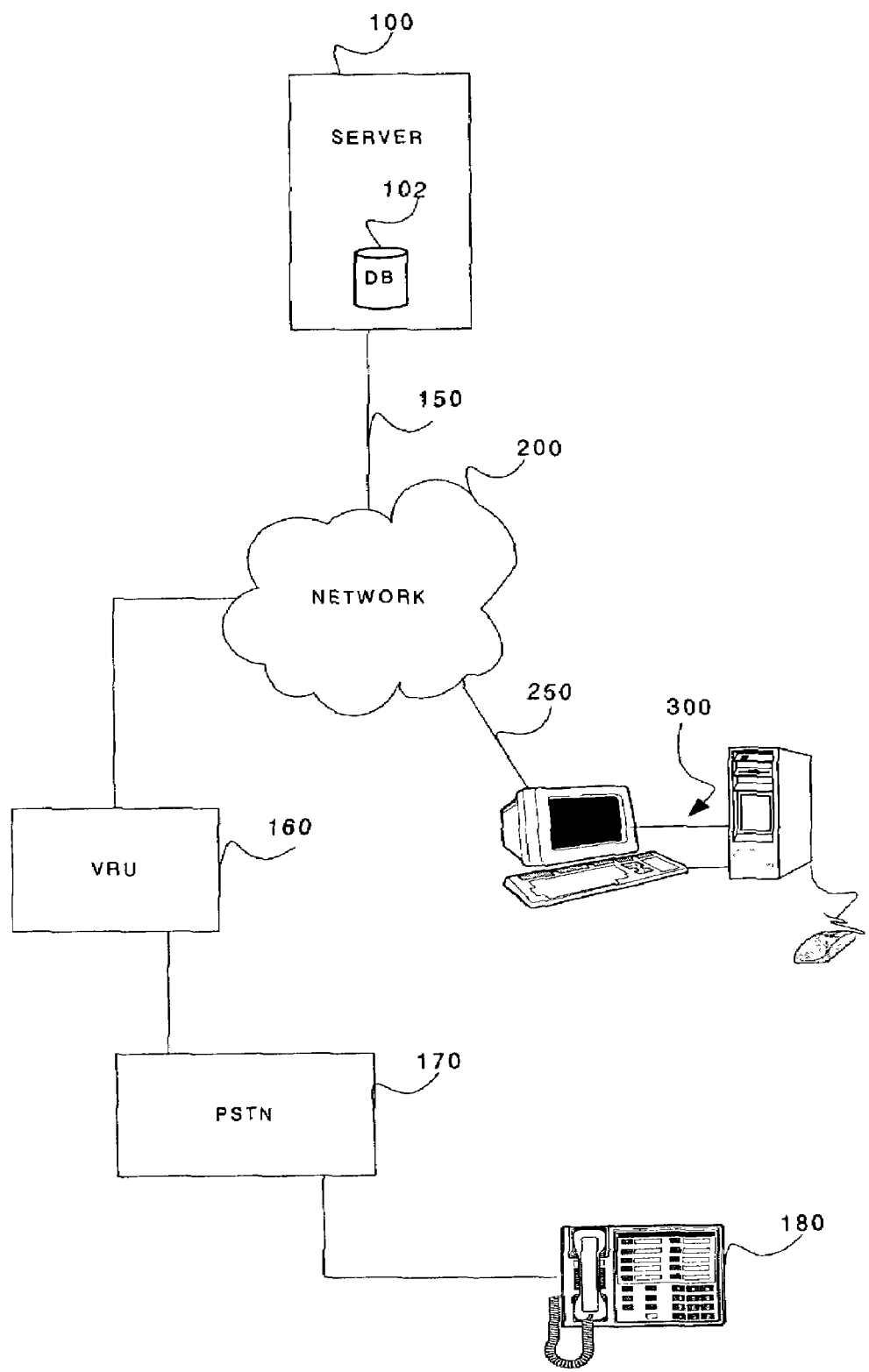
FIG. 1 is a drawing of an example of a system for implementing the present invention.

Exemplary embodiments of the present invention provide flexibility in customizing a variety of accounts with account terms selected by users according to their preferences. The types of accounts which may be customized include, for example, loan accounts, asset accounts, margin accounts, insurance accounts, and brokerage accounts. Loan accounts may include various combinations of secured and unsecured loans, consumer and business loans, and revolving and nonrevolving loans. Particular examples of loan accounts include credit card accounts, which are typically unsecured consumer revolving loans and mortgage accounts, which are typically nonrevolving secured consumer loans. Other types of accounts which may be customized according to exemplary embodiments of the invention include asset accounts such as demand accounts (e.g., demand deposit accounts and savings accounts), certificates of deposit, stored value cards, money market accounts, and trusts. In general, an account is defined by a set of terms which the account holder agrees to in order to open the account. As used herein the term "term" means a feature or characteristic of an account which, together with the other terms, defines the account. The term "account" may refer to both opened accounts and to prospective accounts that have not yet been opened.

The terms of an account may include payment terms, cost terms, credit limits, and liabilities, among others. As used herein the term "cost" refers to the charges made to the user in connection with the account, such as interest and various fees. In the case of a credit card account, the terms of the account typically include the interest rate specified as an annual percentage rate (APR), the credit limit, the annual fee, the payment due date, the type of card product (e.g., platinum, gold, titanium, smart card, etc.), and the card design. The terms may also include the provision of a rewards program whereby the account holder earns points with one or more affiliates which are exchangeable for some form of compensation based on usage of the account. Debit account terms typically include an interest rate and various periodic or transaction related fees, among others, and may include a rewards program. Insurance account terms typically include various periodic fees, limits on payments, specified covered events, and type of insurance, e.g., term or whole life.

The methods and systems for customizing the terms of an account, according to exemplary embodiments of the invention, may utilize the internet for communicating the different options for account terms to the user and for receiving the user's selected preferences. The methods can be carried out, for example, using the system shown in FIG. 1, which includes a server computer 100 connected via a communication link 150 to a network 200 such as the internet. The user may access web pages stored on the server 100 using a client computer 300 connected to the internet via a communication link 250. The user may send information to the server 100 via the internet 200. The server 100 typically includes a database 102 for storing information. The information is typically transmitted using network enabled code.

The server 100 typically comprises a computer adapted to send and receive information to multiple users over a network. For example, the server 100 may comprise a workstation running the Microsoft Windows™ NT™, Windows™ 2000, Unix, Linux, Novell Netware™, Sun Microsystems Solaris™, OS/2™, or other operating system or platform.

Communications links 150, 250 may be, for instance, an intranet, a LAN (Local Area Network), a frame relay connection, an Advanced Intelligent Network (AIN) connection, a synchronous optical network (SONET) connection, a digital T1, T3, E1 or E3 line, a DSL (Digital Subscriber Line) connection, an Ethernet connection, an ISDN (Integrated Services Digital Network) line, a dial-up port such as a V.90, V.34 or V.34bis analog modem connection, a cable modem, or an ATM (Asynchronous Transfer Mode) connection. Communications links 150, 250 may also be, include, or interface to a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, for example. The communications links 150, 250 may also include an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection.

Client 300 may be, for instance, a personal computer or other computing device which runs Microsoft Windows™ 95, 98, NT™, 2000 or XP™, Windows™CE™, PalmOS™, Unix, Linux, Solaris™, OS/2™, BeOS™, MacOS™, VAX VMS, or other operating system or platform. Client 300 may include a microprocessor such as an Intel x86-based or Advanced Micro Devices x86-compatible device, a Motorola 68K or PowerPC™ device, a microcontroller or other general or special purpose device operating under programmed control. Client 300 typically includes electronic memory such as RAM (random access memory) or EPROM (electronically programmable read only memory), storage such as a hard drive, CD ROM or rewritable CDROM or other magnetic, optical or other media, and other associated components connected over an electronic bus, as will be appreciated by persons skilled in the art. Client 300 may be equipped with an integral or connectable cathode ray tube (CRT), liquid crystal display (LCD), electroluminescent display, light emitting diode (LED) or other display screen, panel or device for viewing and manipulating files, data and other resources, for instance using a graphical user interface (GUI). Client 300 may also be or a network-enabled appliance such as a WebTV™ unit, radio-enabled Palm™ Pilot, Blackberry, or similar unit, a set-top box, a browser-equipped or other network-enabled cellular telephone, or other TCP/IP device.

Network enabled code may be, for example, Internet Protocol (IP) code or data, Hyper Text Markup Language (HTML), Extensible Markup Language (XML), Extensible Stylesheet Language (XSL), Wireless Markup Language (WML), Java™, C, UNIX Shell, Visual Basic, ColdFusion™, Common Gateway Interface (CGI), or other computer language or platform.

The database 102 may be, for example, an Oracle™ relational database sold commercially by Oracle Corp. Other databases, such as Informix™, DB2 (Database 2), Sybase™ or other data storage or query formats, platforms or resources such as SQL (Standard Query Language), a storage area network (SAN), Microsoft Access™ or others may also be used.

FIG. 1 also illustrates a conventional voice response unit (VRU) 160 which may be used in conjunction with a conventional public switched telephone network (PSTN) 170 as an interface to the user in lieu of or in addition to the client computer 300. The VRU 160 includes storage for prerecorded or synthesized spoken messages which are played to the user. The user responds to the messages by pressing keys on his or her phone 180, as is well known in the art. The VRU 160, for example, may play a number of prerecorded options for the user and receive the user's selection as input through the keypad on the user's phone 180. The VRU 160 allows the user to exchange information with the server 100. The VRU may be connected to the server 100 via the network 200.

The methods described herein can also be carried out in conjunction with a customer service representative who operates the client computer 300 and communicates the relevant information to a user with a conventional phone or in person. For example, the user can meet a representative of the account provider in an office and exchange information relating to account term selections and user data. Alternatively, the user and the customer service representative can exchange such information by phone.

According to other embodiments, the methods described herein can be carried out with software which is loaded onto a storage device, e.g., a hard drive, connected to or part of the client computer 300. For example, a computer program may be provided by the account provider, e.g., an issuing bank, to the user on a floppy disk, CD ROM, or other removable media, by conventional mail. The computer program may also be downloaded by the user via a network such as the internet from a server, e.g., server 100, maintained by the account provider. The user installs the program on the client computer 300 and executes the program which carries out the methods described herein. The output from the program would typically comprise a set of account terms as well as information identifying the user, and may be in the form of a computer file or a printed page, for example. The user then sends to the account provider the output, e.g., by the internet, phone, or regular mail, enabling the account provider to open the account.

According to still other embodiments, the methods described herein can be carried out by conventional or electronic mail. For example, the account provider can send the user a paper or electronic brochure presenting the various available terms and accounts to the user and can receive the user's responses through the same or a different communication channel. The brochure, for example, may allow the user to input his or her responses directly onto the paper brochure, or it may provide a website address or phone number for inputting responses through the internet or by VRU or a customer service representative. The account provider may also solicit an existing account holder by presenting on an account statement an offer to customize the existing or a new account for the account holder. The account provider may also solicit a prospective or existing account holder by phone, either with outbound voice messaging, e.g., an automated non-interactive phone call when the user is not home or with a live customer service representative. The account provider may also solicit a prospective or existing account holder through a wireless connection, e.g., by calling the user's cell phone or through a wireless connection to the user's computer.

For simplicity, the descriptions of implementing the invention with a VRU, customer service representative, CD ROM, or by mail will be omitted.

Figure 2:
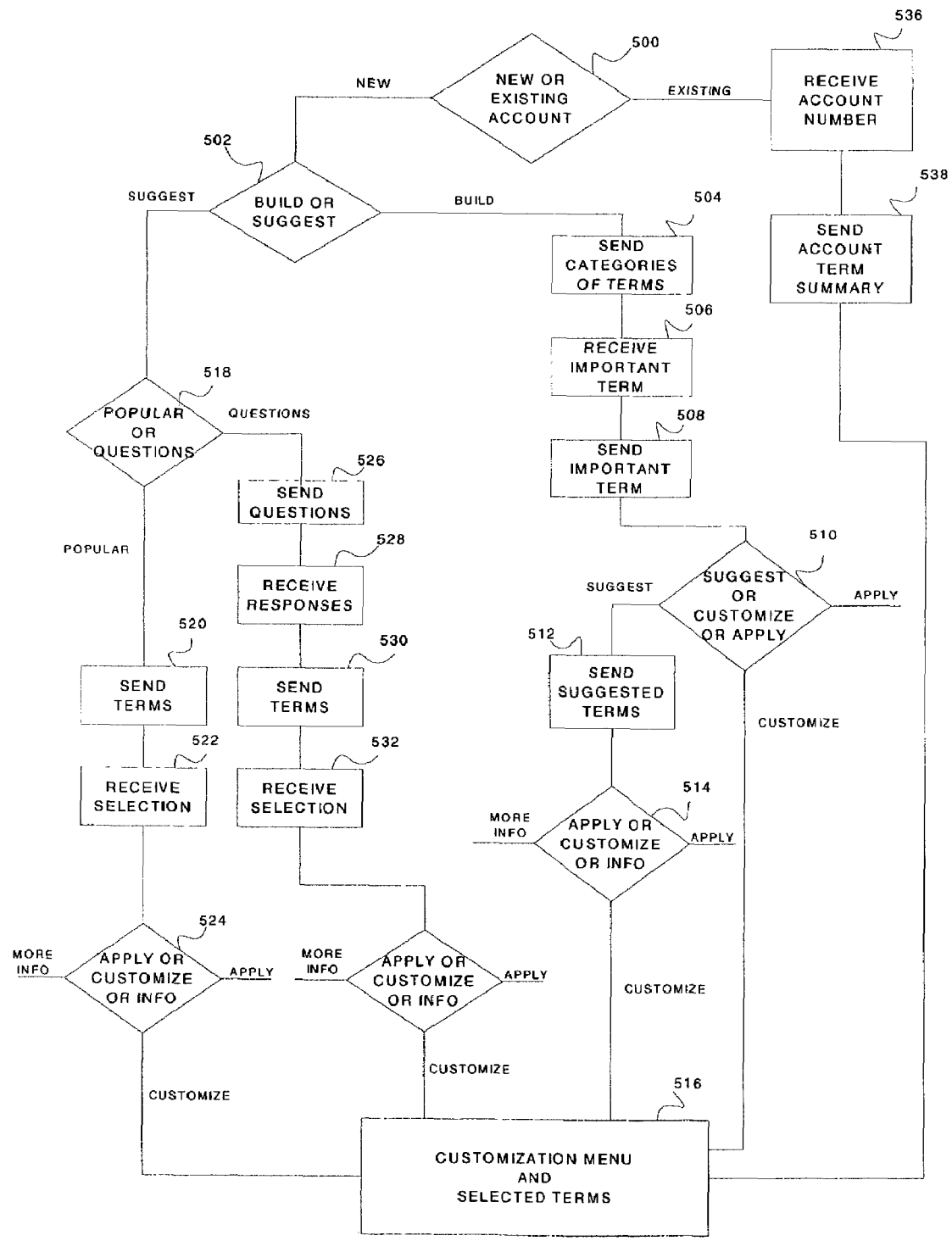
FIG. 2 is a flow chart which illustrates a method according to an exemplary embodiment of the invention.

Referring to FIG. 2, a flow chart depicting a customization method according to an exemplary embodiment of the invention is shown. Initially, the user logs on to his or her client computer 300 (see FIG. 1), establishes a connection to the internet through the communication link 250, and accesses a web page relating to account customization stored on the server 100 of, for example, a financial services provider. The provider may be, for example, a bank or other financial institution which provides financial services such as credit accounts, debit accounts, and brokerage accounts to its customers. The web page relating to account customization is sent to the user in step 500. The web page includes an input screen which allows the user to specify whether the account to be customized is a new account or an existing account. The web page will typically be programmed to automatically send the user's response to the server 100 upon entry by the user.

In the event that the user indicates through the web page that he or she would like to establish a new account, the server 100, upon receiving the user's selection, sends to the user a web page which allows the user to specify whether the user would like to build his or her own account terms from scratch, or start with a recommended set of account terms. As will be discussed further below, the recommended set of account terms can be proposed by the server 100 based either on a user's answers to one or more questions, or on the most popular accounts provided by the service provider (see block 518).

The web page which allows the user to specify whether to start from scratch or receive a suggested account may also provide a means to allow the user to specify a maximum periodic fee for the account. For example, the web page may allow the user to specify a maximum annual fee of zero dollars, fifty dollars, one-hundred dollars, or unlimited. The means for allowing the user to specify a maximum annual fee may be in the form of a banner, located at the bottom of the screen, which remains visible to the user throughout the term selection process, thus enabling the user to change the annual fee at any time. In step 502, the server 100 receives the user's input as to whether the user wishes to build his or her own account or receive one or more recommendations for an account from the server 100.

If the user chooses to build his or her account from scratch, the server 100 sends a web page in step 504 which displays a number of available categories of terms for the account. For example, the web page may include interactive buttons which the user can click on with a mouse to select one or more of the following general categories of terms: affiliations, rewards, product type, and cost. The web page may prompt the user to initially select the category which is most important to him or her.

The product type category may include a list of the following available terms related to, for example, credit card products: titanium, platinum, signature, smart card, gold, and stored value. The cost category may include a number of different available combinations of annual percentage rate and annual fee, for example.

The affiliations and rewards categories may include a list of subcategories of terms in lieu of or in addition to a list of actual terms. For example the affiliations category may have the following subcategories: travel, shopping, internet, sports, university, special interest, and military. Under each of the subcategories may be listed the available terms. For example, the "university" subcategory may provide a list of universities which can be selected by the user to be affiliated with the user's account. Similarly, the rewards category may include the following examples of subcategories: travel, merchandise, cash, and universal, with each subcategory having thereunder an associated list of available terms. Other configurations of displaying available terms are possible, as will be appreciated by those skilled in the art. The web page environment thus allows the user, as an initial step in customizing the account, to select a preferred term by means of a menu system organized logically according to categories and subcategories of terms.

At step 506, the server 100 receives the user's selection as to his or her preferred term. Next, in step 508, the server 100 sends a web page which displays the term selected by the user in addition to other terms which are available for the user to select. For example, as shown in FIG. 4, if the user, under the Affiliation category and University subcategory has selected Ohio State University as his or her preferred term, the server 100 sends back a web page displaying the user's choice. This process allows the user to see the terms of the account as they are selected.

FIG. 2 also illustrates, in step 510, that the web page allows the user to request a recommended product, to continue customizing the account, or to apply for the account. In step 510, the server 100 receives the user's selection as to whether the user would like to receive a recommended account, continue customizing the account, or apply for the account.

One advantageous feature of exemplary embodiments of the invention is that the user can customize the account as much or as little as desired. Thus, in the event that the user is primarily concerned with only one term, the user can select his or her most preferred term and quickly apply for the account, rather than having to take the time to evaluate each available term of the account, many of which the user may not care much about. In such case, the system and method may be programmed to insert a default term for those not selected by the user. Conversely, if desired, the user can customize each term. Thus, the user has the option of ending the customization process at any time, which may enhance user satisfaction.

Referring again to block 510, in the event that the user has requested a recommended product based on the user's selection of a preferred term, in step 512 the server 100 sends at least one recommended product, as defined by a set of terms, to the user. For example, the server 100 may send a web page which displays the important terms or all of the terms of one or more recommended product(s) for the user to evaluate. The web page may also include annotations explaining why each product was recommended, as well as buttons to allow the user to apply for the account, get more information about the terms of the account, or customize one or more of the recommended products. In step 514, the server 100 receives the user's selection as to whether to apply for the account, get more information on the account, or further customize the account.

In block 510, if the user chooses to apply for the account, the server 100 initiates an application process based on the user's selected terms. The application process may entail, for example, gathering some additional data from the user to enable the issuing bank to verify the user's creditworthiness, and ultimately establishing the account based on the user's selections.

Referring back to block 510, if the user chooses to further customize the account, the server 100 sends a web page, for example as shown in FIG. 4, which comprises a customization menu and term display as depicted in box 516 of FIG. 2. Box 516 represents a process which will be described further below in connection with FIG. 3.

Referring back to step 502 in FIG. 2, in the event that the user chooses to request that the server 100 suggest an account rather then having the user select the account terms from scratch, the server 100 sends a web page which allows the user to either see a list of the most popular accounts or answer one or more questions which enable the server to recommend an appropriate account. In step 518, the server 100 receives the user's selection as to whether to view popular accounts or answer the questions. If the user chooses to see a list of popular accounts, the server 100 in step 520 sends the user a web page which displays a number of accounts and associated account terms, such as, in the case of a credit card, product type, introductory APR, subsequent APR, annual fee, image of the card design, rewards program(s), etc. In step 522, the server 100 receives the user's account selection. In step 524, the server sends to the user a recap of the account and associated terms via a web page which may include buttons to allow the user to receive additional account information, apply for the account, or further customize the account.

Referring back to box 518, if the user opts to answer questions rather than requesting to see the terms of popular accounts, the server 100 in step 526 sends a web page to the user containing one or more questions relevant to determining an appropriate set of account terms for the user. For example, a first question may ask the user to specify what feature is most important to the user in a credit card from a number of choices which include, for example, rewards, low rates, high credit line, technology, or special interest groups. A second question may ask the user to specify the user's second most important feature from among the same choices. A third question may ask the user to indicate one or more of his or her hobbies from a number of predefined choices. The web page also typically includes a button to allow the user to request a recommended card based on his or her selections. In step 528, the server receives the user's responses.

Based on the user's responses, the server 100 identifies at least one, and typically more than one, account defined by a set of terms and sends the accounts and associated terms to the user in step 530. In step 532, the server 100 receives the user's selection as to the desired account. In step 534, the server 100 sends to the user a summary of the terms of the account on a web page which also may include buttons to either apply for the account, further customize the account, or get more information on the terms of the account.

Referring back to box 500 of FIG. 2, if the user is a current account holder, the user will so specify and/or also enter an account number or other account identification information and typically a password, for example, into the web page. In step 536, the server 100 receives the account number and password. In response to receiving the account number, the server retrieves the relevant account information, such as account terms, from its database 102. The account terms are then sent to the user in step 538. At this point, the user has the option to modify the existing account.

Figure 3:
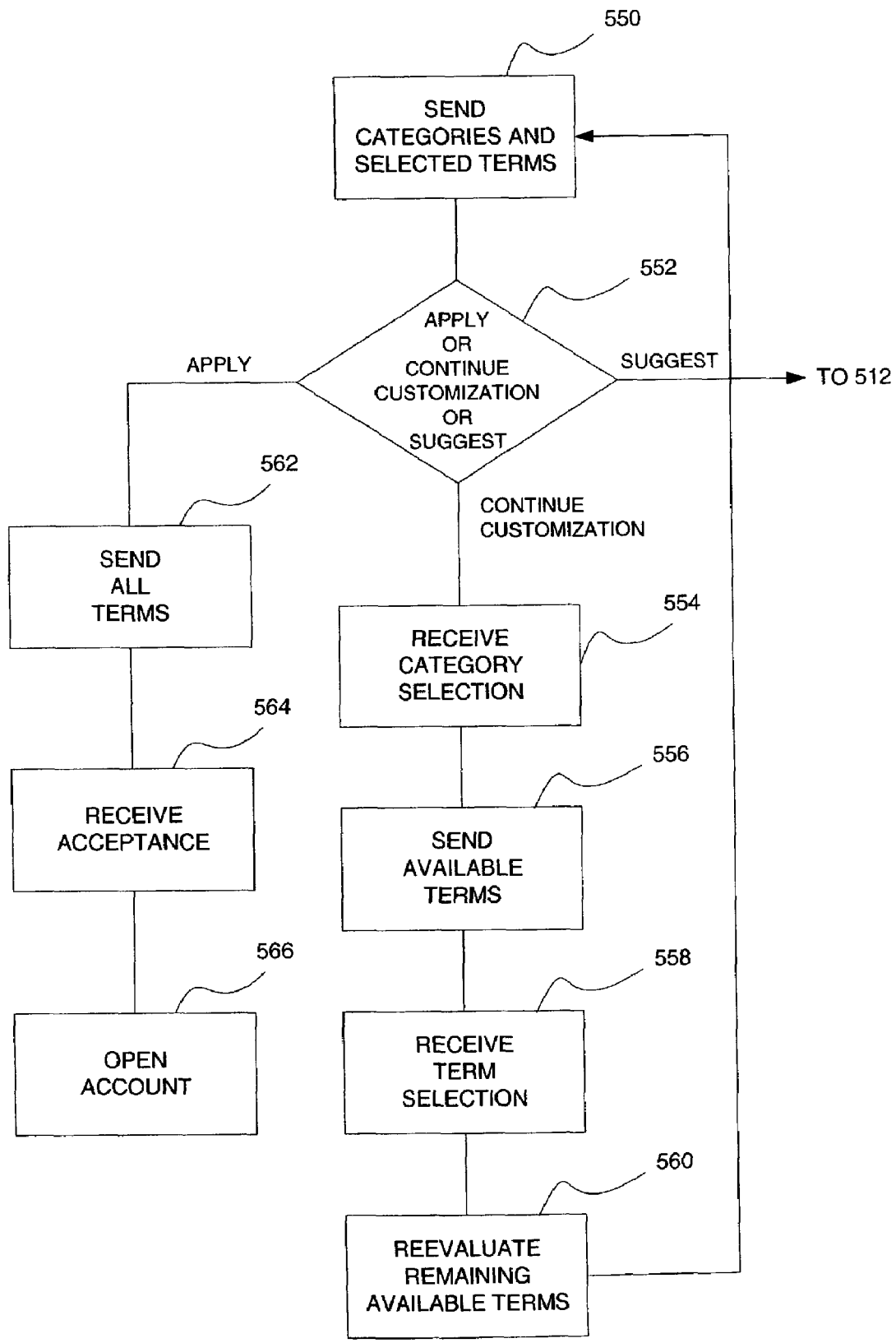
FIG. 3 is a flow chart which illustrates another method according to an exemplary embodiment of the invention.

FIG. 3 is a flow chart of the customization method depicted in box 516 of FIG. 2. An example of a user interface to carry out the customization method is illustrated in FIG. 4. Referring to FIGS. 3 and 4, in step 550 the server 100 sends a web page to the user, for example as depicted in FIG. 4, which displays term categories and selected terms for an account. For example, term categories may including core feature, affiliations, rewards, cost, product type, card design, and payment due date. In addition, FIG. 4 shows one actual selected term, i.e., Ohio State University. FIG. 4 also shows buttons which allow the user to apply for the account, continue customization of the account, or request a recommendation for an account, as depicted in box 552 in FIG. 3. If the user decides to continue customization, the web page allows the user to select a category by clicking on one of the numbered buttons as depicted in FIG. 4. In step 554, the server 100 receives the user's category selection, such as button 1, Affiliation(s). In step 556, the server sends a web page responsive to the user's selection, in this case listing several available affiliates or sub categories of affiliates such as travel, shopping, internet, sports, university, special interest, and military, followed by affiliates under the selected subcategory. The web page allows the user to select one or more of the affiliates to be affiliated with the account. In step 558, the server 100 receives the user's selection as to affiliates, e.g., American Automobile Association.

In step 560, the server 100 reevaluates the remaining terms available to the user based on the user's selections to date in the selection process. For example, the server 100 may be programmed to execute a routine which evaluates the user's current options as to remaining terms based on a fee associated with each term. Terms associated with a fee exceeding the user's specified maximum fee, for example, will be determined to be unavailable, whereas other terms will be depicted as available. The routine can be programmed by the account provider according to any desired criteria.

After reevaluating the remaining available terms, the server 100 returns to step 550 and displays the categories and selected terms, for example, in the form shown in FIG. 4. The user can at that point apply for the account, continue with customization by clicking on any of the numbered buttons, or request a recommendation for an appropriate account. If the user decides to further customize, the user may, for example, click on button 3, Cost, or another of the category buttons, including those with terms already selected. The cost page may include a number of options such as various combinations of an introductory interest rate, long term interest rate, and annual fee, as will be described in more detail below. The customization process can be repeated, if desired by the user, for each of the category buttons shown in FIG. 4. For example, under the category "product type", the user may be presented with such choices as signature, titanium, platinum, smart card, gold, and stored value. Under the category "card design," the user may be presented with an image for each available card design. Under the category "payment due date," the user may be presented with an image of a calendar which allows the user to select the box corresponding to the day of the month which the user would like to have as the payment due date. Alternatively, the user may decide to apply for the account by clicking the "Apply" button after specifying only the terms that are important to the user.

In the case that the account provider has information on the user, such as credit history information or a creditworthiness score, the method may entail a determination of what terms to offer the user based on this information. For example, if a first user is more creditworthy than a second user, the account provider, in addition to offering the first user the same terms as the second user, may offer the first user a lower interest rate and/or lower annual fee than it offers the second user. The first user may therefore receive a larger selection of terms or accounts than the second user. The creditworthiness of a user may be defined, for example, by categorizing the user into a population segment of users demonstrating similar credit behavior as the user. The account provider may also use information it has about a particular user to tailor its account recommendations or the available terms it sends to that user. For example, an account provider may recommend an American Medical Association Visa Platinum card for doctors.

After the user has made his or her selections, the selected terms are displayed along with the categories, for example as shown in FIG. 5. The user then has the option in step 552 (FIG. 3) of applying for the account, in which case a more detailed summary of the selected account terms may be sent to the user in step 562 in a web page which allows the user to accept the terms and apply for the card. In step 564, the server 100 receives the user's acceptance. In step 566, assuming the user is creditworthy, the financial institution operating the server 100 opens the account for the user.

The account provider may also preapprove one or more accounts for a prospective or existing account holder. The preapproval process may entail receiving credit history information on the prospective or existing account holder and selecting one or more accounts or terms appropriate to offer to the user. The account holder may then solicit the user, for example by phone, regular mail, or email providing an identification code for the user and inviting the user to respond to the solicitation. The user may go to a website, for example, enter his or her identification number, and view the features of and compare all of the accounts for which he or she has been preauthorized. The preapproval process relieves the user from having to wait for or be denied approval after selecting the terms of a desired account.

Figure 8:
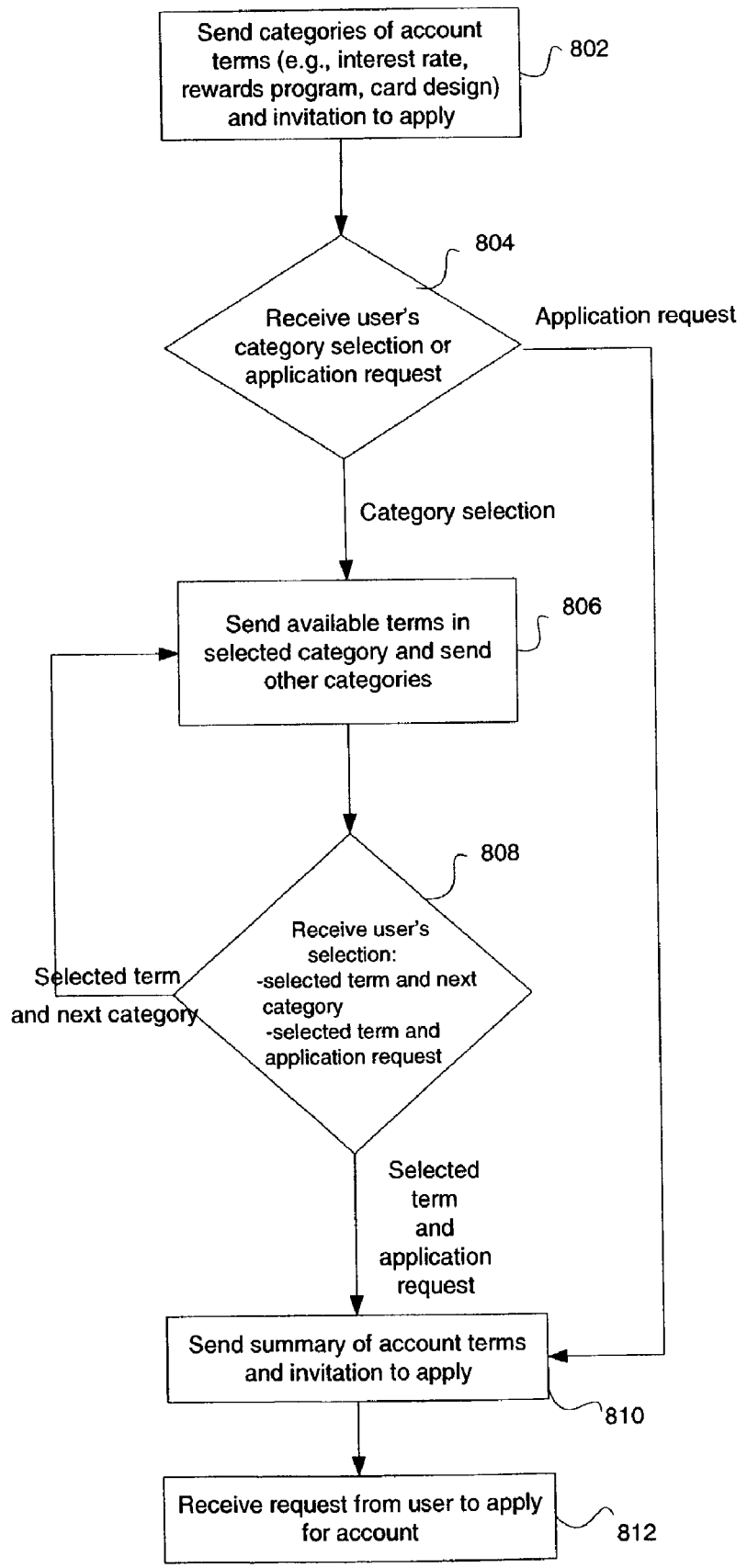
FIG. 8 is a flow chart which illustrates a method according to another exemplary embodiment of the invention.

FIG. 8 illustrates a system and method according to another embodiment of the invention. In step 802, the account provider sends categories of account terms, such as interest rate, rewards program, and card design, to the user. The account provider may also send the user an invitation to optionally accept the default account terms without customizing the account. The user then selects a category of terms or requests to apply for the account, and in step 804, the account provider receives the user's category selection or application request.

If the user opts to apply for the account, the account provider in step 810 sends the user a summary of the default terms for the account and an invitation to confirm his or her desire to apply for the account. If the user decides to select a category of terms, the account provider in step 804 receives the user's category selection and in step 806 sends the available terms in that category to the user. In step 806, the account provider may also send the other categories of terms to the user allowing the user to jump to a different category.

The user selects an available term within the category of terms, e.g., in the interest rate category, a 0% introductory rate for six months followed by prime rate +6.99%. In step 808, the account provider receives the user's selected term. The account provider may also receive a selection of another category, the terms of which the user wishes to see. Alternatively, the account provider may receive a request from the user to apply for the account.

If the account provider receives a selection of another category, the process returns to step 806, wherein the account provider sends the available terms for the selected category to the user. The loop from step 808 to 806 may continue as long as the user continues to select a category of account terms to peruse, even if the user has already selected a term within the category. After the user is satisfied with the terms, he or she may opt to apply for the account.

If the account provider receives a request to apply for the account, the account provider then carries out step 810, which entails sending a summary of the current account terms and an invitation for the user to confirm his or her desire to apply for the account having those terms. In step 812, the account provider receives a request to apply for the account. For a new account, after verifying the creditworthiness of the user, or if the user is preapproved, the account provider opens the account. For an existing account, the account provider modifies the account.

In some cases, it may be advantageous for the account provider to have a multitude of predefined accounts, rather than putting together new combinations of terms for the first time during a communication with a user. Predefined accounts allow the account provider to verify the compatibility of all terms in each predefined account before offering the account to a user. Moreover, if the number of predefined accounts is relatively large, the numerous terms available to the user at each step will provide an experience akin to designing a customized account for the particular user. At the end of the process, however, the account provider may simply match the user's selections to a predefined account.

According to another embodiment of the invention, the account provider may send the user a menu of all available accounts. The menu may be arranged in categories and subcategories to enable the user to easily find a desired card by navigating through the menu system which may be arranged by categories and subcategories of subject matter. The account provider may also provide the user with a search capability, e.g., with a box for entering keyword search terms.

Upon entering the keywords and requesting the search, the account provider searches the files describing the various available accounts or terms and sends the search results to the user, e.g., in the form of a list of accounts from most relevant to least relevant or a list of relevant terms. This process may allow the user to quickly find the feature or account he or she desires based on a most desired characteristic.

In general, the account provider may categorize and subcategorize account terms in any desired manner to enable the user to easily identify and select desired terms and customize his or her account. The account provider may choose to allow the user to customize terms in only one or a small number of categories or alternatively to customize terms in a large number of categories, depending on how much flexibility the account provider desires to give to the user. For example, an account provider may allow users to customize a limited number of terms in credit card accounts only. Alternatively, an account provider may allow users to customize most or all terms in a variety of account types such as loan accounts, asset accounts, brokerage accounts, insurance accounts, etc.

In the case where the account provider allows users to customize a variety of terms in a variety of account types, the account provider may categorize and subcategorize the available terms to facilitate the selection process. For example, the account provider may initially categorize the account types as loan accounts, asset accounts, brokerage accounts, insurance accounts, and margin accounts and send such categories to the user. The account provider may also categorize and subcategorize various services or features available with these accounts. For example, the account provider may offer various transaction platforms, authorization vehicles, rewards programs, affiliates, credit limits, benefits, payment options, servicing options, costs, and linkages amount different accounts. The account provider may send these categorizations to the user to allow the user to customize his or her account. These exemplary categorizations will now be described in further detail.

Initially, the account provider may send the user a list of account types available to the user, such as loan accounts, asset accounts, brokerage accounts, and insurance accounts. If the user chooses loan accounts, for example, the account provider may send the user various subcategories such as unsecured loans, secured loans, consumer loans, business loans, revolving loans, nonrevolving loans, balance transfers, cash advances, convenience checks, etc. The various categories and subcategories may or may not be mutually exclusive. The user may select one or more of the aforementioned categories to define the desired account. For example the user may select an unsecured revolving business loan (e.g., a business credit card) or a secured nonrevolving consumer loan (e.g., a home mortgage). If the user initially chooses an asset account, the account provider may then send the user a number of subcategories, such as demand accounts (e.g., demand deposit accounts or savings accounts), certificate of deposit, money market accounts, or trusts. Other types of accounts can be similarly categorized to allow the user to choose the desired account type with specificity.

After the user has defined the desired type of account, the user may then define other terms in various categories to the extent allowed by the account provider. For example, the user may define a desired transaction platform such as VISA, MasterCard, American Express, Discover, Private Label, PLUS, NYCE, MAC, Cirrus, or ACH, which service credit card and debit card transactions. The user may also define a desired authorization vehicle, i.e., the vehicle which the user uses to authorize a transaction, e.g., check, card, key fob, or simply an account number. If the user selects card, the account provider may send the user various available card designs.

The account provider may also send the user a number of available rewards programs organized into categories and subcategories. For example, the account provider may send the user a list of available rewards programs such as United Airlines miles or Marriott hotel points or subcategories such as travel or shopping. The account provider may also send the user a number of subcategories of features of the rewards programs, such as criteria for earning rewards, methods of redeeming rewards, and types of compensation. Criteria for earning rewards may include transaction based earning (e.g., based on amount of spending or interest paid), balance based earning (e.g., based on balance transfer, revolving balance, or a balance threshold), or other events such as first use of the account or application approval. Methods of redeeming awards may include automatic redemption at a predetermined event, e.g., a number of points earned, or customer initiated redemption. The account provider may also allow the user to specify a redemption channel such as through a web page, a voice response unit, or a customer service representative. The account provider may allow the user to specify the type of compensation he or she receives from the rewards program, such as cash, merchandise, or points from the rewards program of another entity such as United Airlines miles or Marriott points. The account provider may provide the user with the option of earning extra rewards points for payment in full of the account balance, or subtraction of rewards points in lieu of paying one or more account fees.

Another category which the account provider may send to the user is affiliates. Affiliates may include, for example, entities such as airlines which provide rewards to the user based on account usage or entities such as universities which receive compensation from the account provider when the user uses the account. The account provider may also send the user a product category which includes product types such as eCard, platinum, signature, gold, and titanium. The account provider may also provide a number of options for credit limit.

Under the category of benefits, the account provider may send to the user for selection various available benefits such as insurance (e.g., travel insurance, accident insurance, first protect, or personal credit protection), association benefits (e.g., roadside assistance), merchandise offers, club memberships, and/or other services (e.g., overdraft or overlimit protection, warranty manager service, year end or quarterly account summaries, online bill pay, etc.). The account provider may allow the user to opt for or opt out of such benefits.

The account provider may send the user various available servicing options such as payment options, statement options, and customer support options. Payment options may include, for example, payment due date selection, customer-initiated or automatic payment from another account, electronic or paper payment, and selection of a minimum payment due each month, e.g., 2%, 5%, or 10%. Statement options may include, for example, a desired statement channel, statement format and content, and time for providing a statement (e.g., periodic or by request). Customer support options may include, for example, 24-hour telephone support, web support, preferential treatment in phone queues, and replacement of lost or stolen authorization vehicles. The account provider may also allow the user to specify privacy options, such as whether the user authorizes the account provider to share certain account information with third parties and whether the user desires to receive telemarketing calls. The system can also be configured to allow the user to set up a demand deposit or other account with reduced service charges in exchange for online statements and other communications such as notices of late fees, overdrafts, or account balances below a predefined level. The account provider would communicate with the account holder via electronic means and pass on at least a portion of the reduced costs of maintaining the account to the user in the form of reduced service charges.

The account provider may also categorize cost terms such as interest rates and annual fees and allow the user to customize them to an extent acceptable to the account provider. The account provider may send a number of available interest rates to the user, including, for example, introductory APR and final APR. The account provider may provide the user the option of having a variable interest rate or fee dependent on usage or balance of the account. The account provider may also send the user a list of periodic fees (e.g., annual fee or monthly service charge), transaction fees (e.g., cash advance fee, balance transfer fee, convenience check fee, quasi cash fee, money order fee, wire transfer fee, automatic teller machine fees), and/or penalty fees (e.g., overlimit fee, returned check fee, late fee, declined convenience check fee). The account provider may allow users to select fees and interest rates to an extent acceptable to the account provider. The account provider may allow the user to set a minimum account balance necessary to avoid a fee. The account provider may provide favorable costs to user's who hold other accounts with the account provider.

Still other examples of terms and categories of terms which may be presented to the user in connection with different types of accounts include the option to (a) access multiple accounts provided by one or more account providers (e.g. banks) on a single card, (b) access home equity, (c), access a margin account, or (d) include a daily sweep feature as described in U.S. Ser. No. 09/655,886, entitled "System and Method for Linked Account Having Sweep Feature", filed Sep. 6, 2000, by Hirka et al., which is hereby incorporated by reference. The account provider may allow the user to select terms under any or all of the aforementioned categories according to the degree of flexibility the account provider desires to provide to the user. Once the user selects his or her predefined terms, the account provider opens the account.

According to another aspect of the invention, the account provider may allow the user to save his or her selections for a specified time period in a database maintained by the account provider. For example, the user may invest a certain amount of time in choosing terms for an account, but for whatever reason, may not apply for the account at that time. Rather than making the user begin the process anew, the account provider may ask the user if he or she would like to save his or her selections, for example under an alphanumeric identifier, so that the user can retrieve them later. Alternatively, the account provider may save the user's selections automatically and retrieve them automatically based on recognizing the user's computer through a well known technique such as a cookie the next time the user visits the account provider's website.

An advantageous feature of exemplary embodiments of the invention is that the terms available to the user for an account are provided to the user and are thus readily apparent to the user. For example, all of the available affiliates, rewards programs, cost options, standard benefits, additional benefits, card designs, and payment due dates, are easily accessible to the user. This information allows the user to proactively select desired terms for the account. In addition, the system and method can be designed to allow the user to request and receive a more detailed description of each available term offered by the account provider, e.g., by clicking a button associated with the term.

According to another aspect of the invention, the account provider may facilitate evaluation of the various options by sending or displaying terms or accounts together. For example, the account provider may allow the user to request to see a number of cost terms (e.g., interest rate and/or annual fee) side by side so as to easily compare the relative cost of an account and select the desired one. The account provider may also send a number of account summaries together which are displayed on the same computer screen so as to enable the user to compare corresponding terms and make an intelligent decision as to which account best suits their needs. In each case, the screen showing the various options may include a number of buttons allowing the user to specify his or her desired term or account.

Another advantageous feature is that exemplary embodiments of the invention can provide the user with a great deal of flexibility in selecting the cost terms of the account. For example, the server 100 can send the user a web page which allows the user to specify a maximum periodic (e.g., annual) fee value which the user is willing to pay. The server 100 determines what features or benefits of the account are available based on the user's selection. For example, the server may determine that for a maximum annual fee of $25, the account is not entitled to a particular low interest rate or rewards program or group of affiliates. These unavailable features can be highlighted in an appropriate manner by the server 100, e.g., by coloring them gray, to show the user that they are unavailable based on the selected maximum annual fee. The server 100 may also be programmed to dynamically update the available terms for the user. For example, if the user changes the maximum annual fee to $100, then the aforementioned unavailable terms may become available, as depicted by removal of the gray color. The service 100 may also be programmed to carry out a similar method using an interest rate instead of an annual fee. For example, the server 100 can send the user a web page which allows the user to specify a maximum APR value which the user is willing to accept. The server 100 determines what features or benefits of the account are available based on the user's APR selection.

The available terms can be dynamically updated based on the user's selections in the process of customizing the account. Thus, each time the server 100 receives a new selected term from the user, the server can execute a routine to determine which remaining unspecified terms are still available to the user. The routine to determine term availability can be executed by the server 100 according to a computer program which has encoded therein any desired set of rules for term availability as set by the financial institution operating the server.

According to another embodiment of the invention, the user may indicate that he or she would like to have the server 100 calculate an annual fee for the account based on the user's other term selections. Thus, if the user opts for a number of valuable benefits, the annual fee increases. Conversely, the user can forego certain benefits to reduce the annual fee. The server 100, according to this embodiment, may dynamically update the annual fee and send the updated fee to the user each time the user selects another term. The server 100, in addition to specifying the annual fee for the overall account, may itemize the fee for each benefit and send that information to the user, thus allowing the user to make intelligent decisions as to what benefits or terms to keep based on their individual cost.

As shown in FIG. 6, the user may trade certain standard benefits (e.g., travel accident insurance, a year-end account summary, auto rental collision insurance, emergency airline ticket replacement, warranty manager service, and/or lost luggage insurance) for other benefits (e.g., purchase protection, online bill payment, credit life insurance, first protect—debt deferment, quarterly account summary, etc.) which the user may desire more than the standard benefits. Or, the user may opt to pay a higher fee for additional benefits. In each case, the server 100 may dynamically update the itemized cost for each benefit, and overall cost of the account, and/or available benefits.

According to another embodiment of the invention, the server 100 can send to the user a web page which allows the user to specify a first cost term, such as a desired annual fee, and to have the server 100 calculate a second cost term, such as annual percentage rate, based on the first cost term, or vice versa. In this way, the user can structure the account to his or her advantage. For example, a user who keeps a relatively high balance may opt to increase the annual fee in return for a lower annual percentage rate to reduce his or her monthly interest obligation. Conversely, a user who generally pays off his or her balance in full every month may opt for a high annual percentage rate in return for a low annual fee, since the annual percentage rate is seldom applicable.

Other embodiments of the invention relate to customization of the credit limit. According to one embodiment, the server 100 sends to the user a web page identifying the maximum available credit limit for the user. The web page also contains an input box allowing the user to specify a credit limit, which may be below the maximum available credit limit. This feature may be desirable to certain users who wish to limit their credit line for protection in the event of fraudulent use of their card, or for reasons relating to lack of self-control.

According to another embodiment, the credit limit can be customized by the user to change according to different circumstances in which the account is used or characteristics of the transactions. For example, the user may assign by means of a web page a first credit limit to the user himself, and a second, lower credit limit to a second person, e.g., a child having a second card under the user's account. The user may also specify different credit limits for transactions occurring at different times of the day or days of the week, different categories of purchased products, different geographical locations, or other circumstances. For example, the user may specify a lower credit limit for transactions occurring after 6 pm and on weekends, for jewelry, automobiles, and electronics equipment, and for purchases in the user's home city. Thus, the user can customize the credit limit based on the circumstances in which the account is used or characteristics of the transactions.

According to another embodiment of the invention, the account provider presents to the user the option to immediately receive a relatively large quantity of points in exchange for a commitment by the user to use the account by a certain amount within a predetermined time period. For example, the user may agree to charge $15,000 on a credit card within 12 months in exchange for sufficient points to immediately pay airline and hotel costs for 1-week vacation for four people at a Caribbean resort. The points may be granted to the user in the form of "universal" or "account" points, or points associated with one or more affiliates which are convertible into compensation such as airline tickets, hotel rooms, or other benefits.

According to other embodiments of the invention, the user is provided the flexibility to select one or more affiliates and rewards programs. The user can select, for example, more than one affiliate to be associated with the account. Each affiliate has an agreement with the financial institution issuing the account whereby the affiliate agrees to provide certain benefits or compensation to the account holder in exchange for compensation from the issuing financial institution. The user, by means of a web page, under the Affiliation(s) heading (see FIG. 4), can specify a number of affiliates which each provide benefits to the user. In connection with receiving the user's selections as to multiple affiliates, the server 100 may itemize the fee associated with each affiliate to allow the user to evaluate whether the benefits provided by the affiliate justify paying the marginal fee. The server may execute a routine which determines whether the affiliates selected by the user are compatible with each other, based on any restrictions specified by each affiliate. For example, an affiliate may specify that it will not allow any competitor to be an affiliate on the same card or account.

The affiliates may provide benefits in the form of points associated with the affiliate. For example, an airline may provide the user with a point for each mile of air travel purchased with the card. Alternatively, the financial institution issuing the account may allocate universal points to the user based on usage of the account. The financial institution may then allow the user to convert his or her universal points into points of one or more affiliates. The financial institution may also allow the user to convert affiliate points into universal points. In this way, the user can maximize the value of using the account by both selecting a number of desired affiliates and exchanging universal points for the desired affiliate points and vice versa. Other types of affiliates, such as universities or charities, may provide a benefit to the user in the form of association with the university or charity, and the account provider provides compensation to the university or charity based on usage of the account by the user.

According to one embodiment of the invention, the account provider offers, in one account, a combination of a rewards program, where the rewards are provided by a first entity, and an affiliation with a second entity, where the second entity is different from the first entity. In this embodiment, the first entity providing the rewards program is typically a different entity from the account provider. Examples of rewards programs include mileage programs offered by airlines and other rewards programs offered by businesses such as hotels and merchants. Examples of affiliations include universities and colleges, professional associations such as the American Medical Association, environmental organizations, and charitable organizations. The second party affiliated with the account typically receives compensation from the account provider based on usage of the account by the user.

The combination of a rewards program provided by a first entity and an affiliation with a second entity may be particularly desirable for the account holder. The affiliated second entity is typically an organization which the account holder holds in high regard. In the case of a credit card account, the design of the card may display the affiliated second entity prominently. Thus, the card holder, when using the card in public, benefits from being associated with the affiliated second entity. The affiliated second entity also may benefit by receiving compensation based on the account holder's use of the card.

In addition to being associated with the affiliated second entity, the account holder also receives the monetary benefit of the rewards program provided by the first entity. For example, the account holder may receive miles in an airline mileage program, points from a hotel chain, or other compensation from another business for use of the account. Thus, while supporting the affiliated second entity, which may be a university, an environmental group, or a charity, the account holder also receives compensation from the first entity through the rewards program. The combination of a rewards program and an affiliate may provide strong incentive for the account holder to use and retain the account. The combination of a rewards program and an affiliate may be offered to a prospective account holder or to an existing account holder. In the case of an existing account, a rewards program and/or an affiliate may be added to an account having one or the other or neither.

According to another embodiment of the invention, the account provider may allow the user to select two or more rewards programs to be part of a single account. For example, a single account may receive the benefit of airline miles and hotel points based on use of the account.

Figure 7:
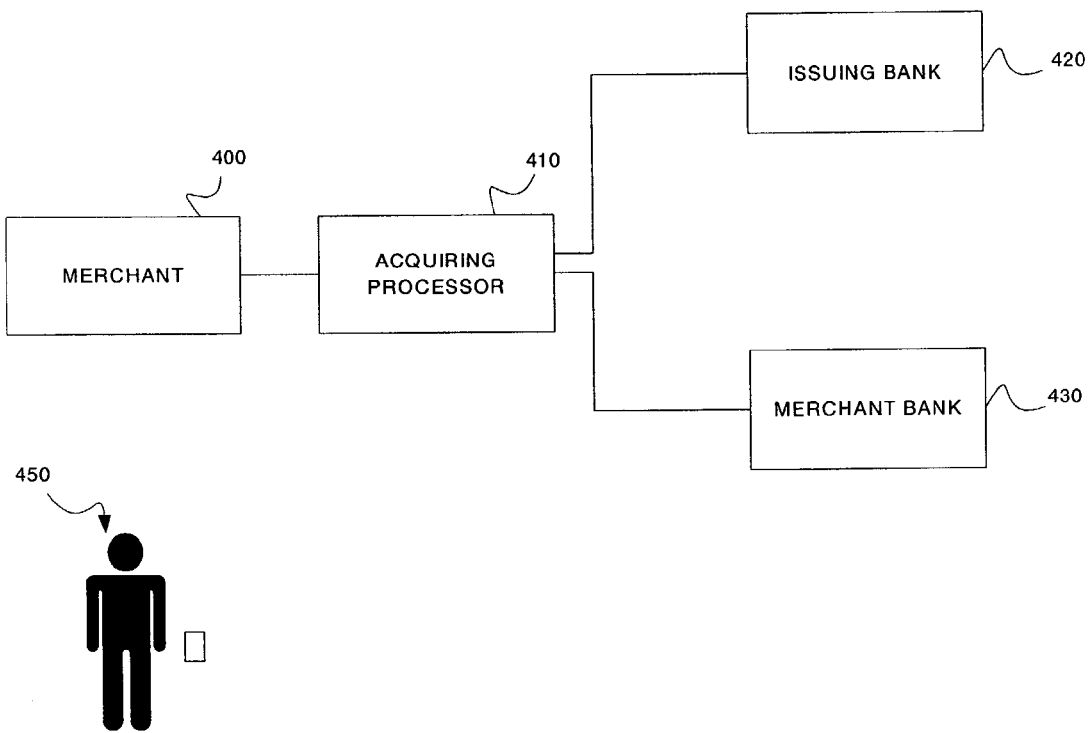
FIG. 7 is a diagram of the entities involved in a typical credit card transaction.

According to other embodiments of the invention, the user can select an account feature which provides real time or near real time notification to the user of account transaction activity. FIG. 7 is a diagram showing the entities which are typically involved in a credit card transaction. A merchant 400 contracts for the services of an acquiring processor 410 to process credit card transactions of the merchant. When a cardholder wishes to purchase an item, data on the transaction is sent from the merchant 400 to the acquiring processor 410. The acquiring processor 410 seeks authorization from the issuing bank 420, i.e., the bank which issued the credit card to the card holder. Upon receiving authorization from the issuing bank 420, the acquiring processor 410 conveys the authorization to the merchant 400. The merchant 400 then notifies the acquiring processor 410 that the goods have been delivered, allowing the acquiring processor 410 to credit the merchant's account and, upon request from the merchant, to deposit payment into the merchant's account at the merchant bank 430.

According to an exemplary embodiment of the invention, immediately upon completing a transaction involving the account of a particular account holder, the acquiring processor 410 sends a message to the issuing bank 420, for example over the internet or by phone. The issuing bank 420 sends the data electronically to a device operated by the account holder immediately subsequent to receiving the data, e.g., by pager, telephone, computer email, mobile phone, or Blackberry. The account holder 450 thus receives real time or near real time notification of any transactions in the account, which may allow early recognition of fraudulent activity. Typically, the notification from the acquiring process 410 to the issuing bank 420 and from the issuing bank 420 to the account holder 450 will be automated such that no human interaction is necessary. Alternatively, the issuing bank 420 may arrange to have the acquiring processor 410 send the notification to the account holder 450 directly without contacting the issuing bank 420.

While the foregoing description includes details and specificities, it is to be understood that these have been included for purposes of explanation only, and are not to be interpreted as limitations of the present invention. For instance, resources described as singular may in embodiments be implemented in a distributed fashion, and resources described as distributed or multiple may in embodiments be combined. Modifications to the embodiments described above can be made without departing from the spirit and scope of the invention, which is intended to be encompassed by the following claims and their legal equivalents.

What is claimed is:

1. A computer implemented method of modifying an existing account comprising the steps of:

receiving, over an electronic network and at a time when the account may be used to complete purchases by the account holder, account identification information from an account holder, wherein the account identification information is entered by the account holder at a web page programmed to accept such information;

sending over an electronic network and to the account holder at least a portion of the existing account terms at a time when the account may be used to complete purchases by the account holder;

displaying the existing account terms on a web page viewable by the account holder;

sending over an electronic network and to the account holder a plurality of new available account terms; and receiving over an electronic network and from the account holder a selection of at least one of the new available account terms.

2. The method of claim 1, further comprising the steps of:

modifying the plurality of new available account terms based on the selection received from the account holder; and sending the modified available account terms to the account holder.

3. The method of claim 2, further comprising the step of matching the user's selection to a predefined account.

4. The method of claim 1, wherein the plurality of new available account terms are grouped into a plurality of categories of account terms.

5. The method of claim 3, wherein the plurality of categories includes a first category comprising interest rate and a second category comprising credit limit.

6. The method of claim 3, wherein one of the plurality of categories comprises payment due date.

7. The method of claim 3, wherein one of the plurality of categories comprises card design.

8. The method of claim 3, wherein one of the plurality of categories comprises rewards program.

9. The method of claim 4, wherein the plurality of categories of account terms are arranged in a menu system.

10. The method of claim 1, wherein the account is a secured loan account.

11. The method of claim 1, wherein the account is an unsecured loan account.

12. The method of claim 1, wherein the account is an asset account.

13. The method of claim 1, wherein the new available account terms are based in part on the credit history of the user.

14. A method of modifying an existing credit card account and associated physical credit card using a web page comprising the steps of:

receiving an account number entered by an account holder in a web page;

sending to the account holder, over a network, at least a portion of the existing account terms for an account identified by the account number, wherein the portion of the existing account terms are displayed to the account holder on a web page, and wherein the sending occurs at a time when the account holder may use the account to complete purchases;

sending to the account holder, over a network, a plurality of new available account terms, wherein the plurality of new available terms are displayed to the account holder on a web page;

receiving from the account holder a selection of at least one of the new available account terms entered by an account holder in a web page, wherein the selection comprises a selected credit card design; and providing to the account holder a physical credit card comprising the selected credit card design.

\* \* \* \* \*

UNITED STATES PATENT AND TRADEMARK OFFICE
CERTIFICATE OF CORRECTION

| | | |
|---|---|---|
| PATENT NO. | : 7,689,504 B2 | Page 1 of 1 |
| APPLICATION NO. | : 10/284394 | |
| DATED | : March 30, 2010 | |
| INVENTOR(S) | : Warren et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1653 days.

Signed and Sealed this
First Day of March, 2011

David J. Kappos
*Director of the United States Patent and Trademark Office*